(12) United States Patent
Brombach et al.

(10) Patent No.: US 12,252,028 B2
(45) Date of Patent: Mar. 18, 2025

(54) METHOD FOR PLANNING A POWER EXCHANGE BETWEEN A CHARGING INFRASTRUCTURE AND AN ELECTRICITY SUPPLY GRID

(71) Applicant: Wobben Properties GmbH, Aurich (DE)

(72) Inventors: Johannes Brombach, Berlin (DE); Marcus Letzel, Achim (DE); Lukas Holicki, Stuhr (DE); Gregor Schürmann, Bremen (DE)

(73) Assignee: Wobben Properties GmbH, Aurich (DE)

( * ) Notice: Subject to any disclaimer, the term of this patent is extended or adjusted under 35 U.S.C. 154(b) by 534 days.

(21) Appl. No.: 17/537,252

(22) Filed: Nov. 29, 2021

(65) Prior Publication Data
US 2022/0169138 A1    Jun. 2, 2022

(30) Foreign Application Priority Data

Nov. 30, 2020   (EP) .................................... 20210674

(51) Int. Cl.
*H02J 7/00*     (2006.01)
*B60L 53/63*    (2019.01)
(Continued)

(52) U.S. Cl.
CPC ............... *B60L 53/63* (2019.02); *B60L 53/66* (2019.02); *B60L 55/00* (2019.02); *B60L 58/12* (2019.02);
(Continued)

(58) Field of Classification Search
CPC .......... B60L 53/63; B60L 53/66; B60L 55/00; B60L 58/12; B60L 58/13; H02J 3/322; H02J 7/0048
(Continued)

(56) References Cited

U.S. PATENT DOCUMENTS

2005/0127855 A1   6/2005 Wobben
2015/0298565 A1   10/2015 Iwamura et al.
(Continued)

FOREIGN PATENT DOCUMENTS

WO       03/062018 A2    7/2003

OTHER PUBLICATIONS

Peng et al., Stochastic Coordination of Plug-In Electric Vehicles and Wind Turbines in Microgrid: A Model Predictive Control Approach, May 2016, IEEE, vol. 7, No. 3, pp. 1537-1551 (Year: 2016).*

(Continued)

*Primary Examiner* — Zixuan Zhou
(74) *Attorney, Agent, or Firm* — Seed IP Law Group LLP

(57) ABSTRACT

A method for planning a power exchange between a charging infrastructure and an electricity supply grid. The infrastructure has a plurality of terminals for connecting and charging electric vehicles such that the electric vehicles can exchange power with the grid via the terminals. Each electric vehicle has an electrical storage unit with a variable individual state of charge for drawing and outputting power, and all of the storage units connected to the infrastructure form an overall storage unit of the infrastructure, which overall storage unit is characterized by a total storage capacity and a total state of charge that are variable. The prediction of arrival times of the vehicles at the terminals thereof is created, and a total state of charge prediction is created for a prediction period depending on the prediction of the arrival times, wherein the total state of charge prediction is created as a time profile.

18 Claims, 6 Drawing Sheets

(51) Int. Cl.
*B60L 53/66* (2019.01)
*B60L 55/00* (2019.01)
*B60L 58/12* (2019.01)
*B60L 58/13* (2019.01)
*H02J 3/32* (2006.01)

(52) U.S. Cl.
CPC .............. *B60L 58/13* (2019.02); *H02J 3/322* (2020.01); *H02J 7/0048* (2020.01)

(58) Field of Classification Search
USPC ............................................ 320/109; 701/22
See application file for complete search history.

(56) References Cited

U.S. PATENT DOCUMENTS

2018/0170202 A1    6/2018  Kim
2021/0018331 A1*   1/2021  Tsuchiya ............ G01C 21/3697

OTHER PUBLICATIONS

Kou et al., "Stochastic Coordination of Plug-In Electric Vehicles and Wine Turbines in Microgrid: A Model Predictive Control Approach," *IEEE Transactions On Smart Grid* 7(3):1537-1551, May 2016. (15 pages).

Vandael et al., "A Scalable Three-Step Approach for Demand Side Management of Plug-in Hybrid Vehicles," *IEEE Transactions on Smart Grid* 4(2):720-728, Nov. 29, 2012. (9 pages).

* cited by examiner

METHOD FOR PLANNING A POWER EXCHANGE BETWEEN A CHARGING INFRASTRUCTURE AND AN ELECTRICITY SUPPLY GRID

BACKGROUND

Technical Field

The present invention relates to a method for planning a power exchange between a charging infrastructure and an electricity supply grid. The invention also relates to a charging infrastructure, in particular a fleet.

Description of the Related Art

Ideas about making electromobility also useful for networks, namely charging electrical storage units of the electric vehicles from an electricity supply grid not only when needed but also providing the option of temporarily providing electrical power from such electrical storage units to the electricity supply grid, are known. Such technologies are grouped together under the term "vehicle to grid" (V2G). This idea is described for example in the international application WO 03/062018 A2 and in the associated US application US 2005/0127855 A1.

Many system services however require very high availability. The batteries of vehicles can therefore only operate in a way that serves the grid when they are connected to a charging point with a defined state of charge at the right time. This usually cannot be ensured in the case of passenger vehicles, in any case if they are used privately. However, even in the case of electric motor vehicles in the logistics sector, there may be deviations in the timetable, with the result that the state of charge and time vary.

The European patent office searched the following prior art in the European priority application: KOU PENG ET AL: "Stochastic Coordination of Plug-In Electric Vehicles and Wind Turbines in Microgrid: A Model Predictive Control Approach," IEEE TRANSACTIONS ON SMART GRID, IEEE, USA, vol. 7, no. 3, May 1, 2016, pages 1537-1551 as well as US 2015/0298565 A1 and US 2018/0170202 A1.

BRIEF SUMMARY

One or more embodiments are directed to improving a planning ability particularly of time and range of the availability of electric vehicles in order to support the electricity supply grid.

A method is proposed. Said method relates to planning a power exchange between a charging infrastructure and an electricity supply grid. Electrical power can therefore be fed into the electricity supply grid but can also be drawn from the electricity supply grid via said charging infrastructure.

The charging infrastructure has a plurality of charging terminals for connecting and charging electric vehicles. The charging terminals may be spatially distributed, for example may include various depots (local public transport, city cleaning department, waste collection service), warehouses (postal and packaging services), ports (electric boats, ferries), airport terminals (vehicles of the airport infrastructure, air taxis on a route service), to cite just some examples. The electric vehicles may therefore exchange electrical power with the electricity supply grid via said charging terminals. The charging infrastructure thus then exchanges power with the electricity supply grid. A charging terminal may in this case control the charging or discharging of an electrical storage unit, but consideration is also given to the control or a portion thereof being performed in the electric vehicle itself, which is connected to the respective charging terminal anyway. However, such control in the electric vehicle may also receive control signals, particularly for power values to be drawn or to be output, from the charging infrastructure.

Each electric vehicle that may therefore be connected to the charging infrastructure has an electrical storage unit with a variable individual state of charge in order to thus draw or output electrical power.

All of the electrical storage units connected to the charging infrastructure form an overall storage unit of the charging infrastructure, which overall storage unit is characterized by a total storage capacity and a total state of charge. Said overall storage unit may in this respect be considered as a virtual storage unit in that the storage capacities of the individual electric vehicles are added together.

The total storage capacity is variable because it depends specifically on which and how many electric vehicles are connected to the charging terminals and thus to the charging infrastructure at the respectively considered moment. In other words, the total storage capacity decreases when an electric vehicle leaves the charging infrastructure, that is to say drives away, and it increases when an electric vehicle arrives and is connected.

The total state of charge is also variable. In addition to the fact that electric vehicles may arrive at the charging infrastructure and may also leave it again, the respective individual state of charge thereof however changes because said electric vehicles are specifically charged or discharged and this therefore also leads to a variable total state of charge.

Provision is also made for a prediction of arrival times of the electric vehicles at the charging terminals thereof to be created. It has been identified here in particular that, even in the case of fleets that are used for commercial purposes and may have timetables, arrival times of the electric vehicles at the charging infrastructure are not fixed or may be fixed only poorly or inaccurately. In particular, the traffic may also play a role in this uncertainty. Although departure times are also important for planning the power exchange between the charging infrastructure and the electricity supply grid, they can often be predetermined easily.

It is therefore proposed to create a prediction for the arrival times, which will be described in more detail below.

A total state of charge prediction is created as a prediction of the total state of charge for a prediction period depending on the prediction of the arrival times.

In this case, also for the purpose of explanation, it is assumed that the electric vehicles of the charging infrastructure, that is to say of a fleet, return to the charging infrastructure at the end of a cycle, in particular a day, that is to say arrive at the charging terminals thereof, wherein this will take place gradually. Each time an electric vehicle arrives here and is connected to the charging terminal thereof and thus to the charging infrastructure, the total capacity and the total state of charge of the overall storage unit, that is to say this virtual overall storage unit, increase. A prediction of the total state of charge may therefore be derived and thus created from the prediction of the arrival times. In this case, the respective state of charge of the arriving electric vehicle is additionally included, in particular as a prediction of said state of charge.

It is proposed here that the total state of charge prediction is created as a time profile of the total state of charge. This time profile of the total state of charge therefore reflects how and when the electric vehicles gradually arrive at the charging terminal thereof and thus at the charging infrastructure.

This time profile of the total state of charge may then be used to plan, in particular to predetermine, the power exchange between the charging infrastructure and the electricity supply grid. The power exchange can specifically be planned so that the available energy to be expected according to the time profile of the total state of charge can be used for infeed, wherein the time profile specifies when and how much power can be fed in. However, in light of the total storage capacity, the total state of charge also provides a piece of information about how much energy may be drawn from the electricity supply grid and thus how much power may be drawn from the electricity supply grid over a determined period in order to feed said power into the storage units. From the total state of charge, it is possible to derive how much energy has to be drawn from the grid in order to charge the storage unit.

In particular, it is proposed that the total state of charge prediction is created depending on timetables of the electric vehicles. This is based in particular on the concept of using fleets for planning exchange power and in the process taking into account specific information regarding planned journeys of the individual electric vehicles. It is thus possible to achieve a significant improvement with respect to a purely statistical consideration of a large amount of electric vehicles. A fleet of this kind, or an otherwise organized group of electric vehicles, may be included in the grid planning as a joint grid subscriber, whereas the individual vehicles may equally be taken into account individually. It is thus possible to achieve a high degree of accuracy for the fleet as one unit.

In accordance with one aspect, it is proposed that the total state of charge prediction is created at least one day before the start of the prediction period. It has been identified here in particular that the behavior of electric vehicles, in particular when they are used for commercial purposes, repeats daily and thus planning from one day to the next is useful but greater intervals are also considered, for example a week. However, it has also been identified that power or energy planning for the electricity supply grid is usually carried out at least a day in advance. Such planning in which in particular consumers also give notice of or even directly order their quota is often carried out at midday or in the early afternoon. In particular in this case the charging infrastructure is intended to make a contribution and therefore advance planning or prediction a few minutes or hours before the period in question is hardly helpful because then the plans have been finalized in the electricity supply grid. In the case of applications in the logistics field in which cycles over several days are possible, it is possible to offer a period over several days.

The prediction of the arrival times can accordingly also be performed at least one day in advance. This usually also means that current values of the respective vehicle can hardly be included in the prediction, that is to say whether a vehicle is currently in traffic or has got lost. When planning at least one day in advance, the respective electric vehicles have usually not yet left for the relevant day on which the arrival times are intended to be predicted. The prediction therefore has to be guided by other criteria, which will be explained more below. However, this does not exclude an existing prediction also being readjusted in a shorter period than in one day in order to correct a likewise already existing plan.

In accordance with one aspect, it is proposed that an individual state of charge prediction is created for each individual state of charge, in particular as a time profile of the individual state of charge, and that the total state of charge prediction is additionally created depending on the individual state of charge predictions.

In particular, such an individual state of charge prediction may relate in each case to the state of charge that is assumed, that is to say predicted, upon arrival of the respective electric vehicle. In the simplest case, a time profile may appear so that this initial value is constant over time. However, changes after arrival are also taken into consideration, for example owing to a low self-discharge or owing to functions that are also intended to be maintained for the parked vehicle. This could include a heating system, for example, which is operated to counteract frost, to cite just one example.

In any case, the individual state of charge prediction is then included in the total state of charge prediction. In particular, the total state of charge prediction will lead to a total state of charge that increases with time, specifically due to respective electric vehicles continuing to arrive.

In accordance with one aspect, it is proposed that the prediction of the arrival times is created depending on at least one of the following pieces of prediction information.

A piece of information about a timetable of the respective electric vehicle that comprises planned travel times and optionally planned travel routes is proposed as a piece of prediction information for arrival times. The planned travel times also contain a planned arrival time and this may be taken as a basis for the prediction and then may be changed depending on further prediction information regarding the predicted arrival time. Depending on the vehicle type, a timetable may also be representative of a ferry schedule, a flight schedule, a duty roster or scheduled delivery routes, to cite just a few examples.

A current piece of transport infrastructure information of a region relevant to the respective electric vehicle is proposed as a further piece of prediction information for arrival times. Such current transport infrastructure information is, for example, roadwork sites and/or diversions. These may also include temporary speed limits due to road damage, but also the completion of a bypass. It is possible to derive from this whether a later or an earlier arrival of the electric vehicle is able to be assumed. This may be combined with a piece of information about the timetable by virtue for example of the arrival time according to the timetable being taken as a start, said arrival time however then being improved based on the transport infrastructure information.

Arrival times of preceding days or preceding similar routes stored for the respective electric vehicle are proposed as a piece of prediction information for arrival times. In particular, an average value may be formed from these arrival times of preceding days and, where necessary, a variance of these arrival times may also be taken into consideration. Further information such as the mentioned transport infrastructure information may be added in order to estimate whether the average value mentioned by way of example can be achieved or rather a delay or an earlier arrival may be anticipated.

A weather forecast may be used as a piece of prediction information. An effect on the arrival times is able to be determined directly or indirectly from a weather forecast. An indirect consideration may consist for example in that a higher volume of traffic is to be expected in rainy weather and therefore rather a delay is to be anticipated, whereas a lower volume of traffic is to be anticipated in dry, sunny weather. A direct piece of information can be derived for example from black ice or snowfall since then the electric vehicles possibly are not able to drive as quickly even in the case of a good traffic situation.

A piece of information about events that affect the volume of traffic of the region relevant to the respective electric vehicle is proposed as a piece of prediction information for arrival times. Such events may be advertised demonstrations or large events such as large sporting events. In particular the latter may lead to an increased or reduced volume of traffic, depending on the time. While the event is attracting a lot of spectators, the volume of traffic is low; however, if a lot of spectators leave the event within a narrow time frame, the volume of traffic is high. This accordingly affects the arrival times.

A piece of information about a respective driver of the respective electric vehicle and/or about a driving behavior of the respective electric vehicle may also be proposed as prediction information. Empirical values regularly lead to some drivers—for whatever reason—returning rather early and others returning rather late. This may also affect the driving behavior of the respective electric vehicle, in particular when the electric vehicle is fixedly assigned to a driver. However, consideration is also given to the fact that the vehicles are behaving differently for technical reasons, for example. By way of example, it is possible to make a detour around a traffic jam more easily using a small vehicle than using a large vehicle.

It is possible to recognize and it has also partly already been explained that all of these pieces of prediction information for arrival times may also be considered in combination. All of these pieces of prediction information are usually also known well over a day in advance and may therefore also be included in a prediction that is intended to be created more than one day before the prediction period.

In accordance with one aspect, the individual state of charge prediction is created depending on at least one of the following pieces of prediction information for individual states of charge.

A piece of information about a timetable of the respective electric vehicle that comprises planned travel times and optionally planned travel routes is proposed as a piece of prediction information for individual states of charge. It is possible to derive from these travel times and, where applicable, travel routes the amount of energy that the electric vehicle will consume. It is accordingly possible to estimate how the respective individual state of charge of said electric vehicle changes and thus what value it will approximately have when the electric vehicle returns to its charging station.

A piece of information about properties of the electric vehicle, in particular properties of the storage unit of the electric vehicle, is proposed as a piece of prediction information for individual states of charge. A degree of wear of the storage unit is considered here in particular. This degree of wear of the storage unit may be derived from the behavior thereof; however, it is also possible to derive from this in particular how many charging/discharging cycles this electrical storage unit has already undergone. Information about such cycles is often available to the charging controller and is therefore easy to obtain.

A piece of information about individual states of charge stored for the respective electric vehicle upon arrival at the charging terminal according to an acquisition of preceding days or routes is proposed as a piece of prediction information for individual states of charge. That is to say measured individual states of charge in the past that have been recorded respectively upon arrival of the electric vehicle are taken into account. In particular an average value over these states of charge of respectively previous arrival times may be formed. In addition, a variance of such states of charge may be taken into account. Provided boundary conditions remain the same, such an average value may even form a good prediction for the corresponding individual state of charge.

A piece of information about a predeterminable individual state of charge of the respective electric vehicle at the beginning of a journey when the electric vehicle is disconnected from the charging terminal thereof is proposed as a piece of prediction information for individual states of charge. An initial state of charge that is present at the beginning of the journey and from which the expected consumption is then to be drawn is thus taken into account. In this case, it is necessary to take into account the fact that this initial individual state of charge cannot be acquired with a prediction of over a day, but instead has to be assumed. The assumption used is a predeterminable individual state of charge, which may also be predetermined specifically because it is ultimately determined at the time at which the charging has been ended. It is thus possible to predetermine this individual state of charge by correspondingly controlling the charging.

This therefore relates to the beginning of the journey immediately before the prediction period. However, the prediction that is to be created is preferably created over a day in advance, that is to say over a day before the beginning of the prediction period, and therefore also before the beginning of the journey for which the predeterminable individual state of charge is taken into account.

A current piece of transport infrastructure information of a region relevant to the respective electric vehicle is proposed as a piece of prediction information for individual states of charge. It has been recognized here that not only the arrival time or the delay thereof can be affected by such transport infrastructure information like construction works or diversions, but also that the state of charge is dependent on this because specifically the consumption may vary as a result thereof.

The consideration of a weather forecast is proposed as a piece of prediction information for individual states of charge. It has also been recognized here that the weather may also have a, direct or indirect, influence on the consumption and therefore the state of charge. The correlations may be similar to those that have been described above for the prediction information for arrival times.

A piece of information about events that affect the volume of traffic of the region relevant to the respective electric vehicle is also proposed as prediction information for individual states of charge. Such events that likewise have already been explained above may also influence the consumption and therefore the state of charge.

A piece of information about a respective driver of the respective electric vehicle and/or about a driving behavior of the respective electric vehicle is also proposed as prediction information for individual states of charge. This also influences not only the arrival time, as described above, but may also influence the consumption.

A piece of information about a state of the electric vehicle, in particular a piece of information about a state of the storage unit of the electric vehicle, is also proposed as prediction information for individual states of charge. Consideration is given in particular to the fact that an electrical storage unit with an increasing level of wear may have a higher self-discharge or a lower efficiency, which therefore influences the state of charge. The charging capacity of a correspondingly worn electrical storage unit is also reduced, which leads to a fully charged state being lower than in the case of an identical but new electrical storage unit, with the result that the remaining state of charge is also lower at the end of the journey. A temperature of a storage unit of an electric vehicle may also be a piece of prediction information. The temperature of an electrical storage unit may also have an effect on the capacity thereof, which may be taken into account hereby.

A piece of information about a model inaccuracy or errors of an acquisition of an individual state of charge is proposed as a piece of prediction information for individual states of charge. Such an inaccuracy of the acquisition may be particularly relevant when an incorrect initial state of charge is assumed as a result thereof, which then also has an effect on the final state of charge upon return to the charging station. However, the acquisition of an individual state of charge upon return may also be relevant, specifically when such states of charge from the past are taken into account and therefore specifically are accordingly taken into account incorrectly or inaccurately. It is also proposed here to take this into account in the individual state of charge prediction.

For all of this information that relates to possible prediction information for individual states of charge, a combination of any information is also taken into consideration, as also results directly from the explanations of the individual effects.

In accordance with one aspect, it is proposed that the total state of charge prediction is changed, after it has been created, depending on at least one piece of change information. The total state of charge prediction may therefore be readjusted. This is also taken into consideration after a day has elapsed. It has been recognized here that, although a prediction is desirable for a period of over a day, some changes are unavoidable and it is then better to adjust the overall prediction at short notice and in particular to instruct the grid operator or power provider accordingly.

Consideration is given in particular to the fact that the total state of charge prediction is changed depending on a change of the prediction of the arrival times and/or depending on a change of the individual state of charge prediction. These changes or the information relating to these changes may then each form the change information or a portion thereof.

The overall prediction is preferably created for more than one cycle, in particular more than one day, in advance and proceeds in particular, as has been explained above, from various assumptions with respect to the travel of the respective electric vehicles. It anticipates in particular a traffic situation or a driving behavior or a behavior of the electrical storage unit for a period that has not yet begun at that moment. However, if changes occur now during the travel immediately before the prediction period, in particular significant changes occur, such as a traffic collision, for example, which considerably delays the arrival time, this may be a piece of change information that relates to a change in the prediction of the arrival times. This changed prediction of the arrival time may also be considered as a piece of change information.

Furthermore, electric vehicles themselves usually have sensors that continuously identify the state of charge. This information may be transmitted in particular via radio and it is possible to check whether the anticipated behaviors of the respective individual states of charge correspond or at least substantially correspond thereto. If there are large deviations, it can be assumed that it also leads to a deviation of the individual state of charge at the arrival time. This assumption is therefore a change in the individual state of charge prediction and it forms a piece of change information using which the total state of charge prediction is changed, that is to say may be adjusted to the changed states.

In accordance with one aspect, it is proposed that the prediction of the arrival times is changed, after it has been created, depending on at least one piece of additional information for arrival times. The procedure here is thus similar to in the case of the change of the total state of charge protection, after it has been created. The following pieces of information are proposed for use alone or in combination with one another as possible additional information for arrival times:

a piece of information about the fact that the timetable has been changed, in particular has been changed manually. It has been recognized that last-minute timetable changes are also taken into consideration, for example in the case of special events or last-minute diversions, and it is proposed to take this into account and, where necessary, to verify the prediction of the arrival times.

a piece of information about an acquired traffic situation and/or about a last-minute prediction of a traffic situation. It has been identified here that last-minute changes in the traffic situation may also occur, which should be taken into account here. A collision may also furthermore trigger a last-minute prediction of a traffic situation, because congestion frequently follows a collision, whether it be at the collision location or on known diversion routes.

a piece of information regarding the current weather or a last-minute weather prediction that has been created for the prediction period after the total state of charge prediction has been created. It has also been recognized here that, although nowadays weather predictions stretch over several days, weather predictions may also be erroneous and may also change within a day. This is also proposed for a readjustment of the prediction of the arrival times. In this case, it is possible to take into account a current weather phenomenon, such as a flurry of snow occurring, or this may also be able to be recognized in a last-minute prediction, which is over an hour or a few hours, in particular less than ten hours.

a piece of information about a deviation of a current position of an electric vehicle from a planned position according to the timetable. It has been recognized here that deviations are able to be recognized even over the course of the day on which there is a departure from a timetable. Delays often cannot be made up over the course of the day or it is possible at least to assess whether or in what scope such delays may still be made up.

a piece of information about loading or average passenger occupancy of the electric vehicle. The prediction is also created here in principle proceeding from an average loading or occupancy. If, however, there are deviations, this may have an effect on the arrival time. Particularly in the case of a lot of people in a local transport vehicle, a high number of people may indicate that the vehicle stops more often and/or longer for the purpose of boarding and alighting. There are also similar considerations for the loading of an electric vehicle, which accordingly requires more time for unloading. The driving dynamics of the vehicle may also be affected by this and it is therefore proposed to use this as additional information in order to readjust the prediction of the arrival time.

In accordance with one aspect, it is proposed that the individual state of charge prediction is changed, after it has been created, depending on at least one piece of additional information for individual states of charge. It has also been recognized here that changes occur at the last minute, that is to say after the prediction has been created, and may respectively influence the individual state of charge. A readjustment is therefore proposed. To this end, the following additional information for individual states has been recognized as useful for individual or combined consideration:

- a piece of information about an acquired traffic situation and/or a last-minute prediction of a traffic situation. It has been identified that such last-minute changes in the traffic situation may also be acquired and may influence the individual states of charge. In particular, congestion that arises suddenly and that leads to circumnavigation may influence the state of charge.
- a piece of information regarding the current weather or a last-minute weather prediction that has been created for the prediction period after the total state of charge prediction has been created. Such weather forecasts that are changed at the last minute may also influence the state of charge and therefore an adjustment of the individual state of charge prediction is proposed. Above all, cold weather may reduce the efficiency of the battery and increase the consumption of the heating system. The same applies for warm weather and sunshine, which may lead to a higher consumption of the air-conditioning system.
- a piece of information about a deviation of a current position of an electric vehicle from a planned position according to the timetable. Timetable deviations are also often an indication of the vehicle also being driven differently than planned and therefore a different consumption is present, with the result that this has an influence on the state of charge. In particular, it is proposed that in this case a position of the electric vehicle is determined by way of location monitoring, in particular by means of a global positioning system (GPS), and compared with the timetable. Effects on the state of charge may then also be derived by way of empirical values, for example. Such a changed position according to which the vehicle for example returns behind an original timetable may often also contain the indication that still further delays and changes in a departure from the timetable are to be expected. This may also be used for an adjustment of the individual state of charge processes.
- a piece of information about loading or average passenger occupancy of the electric vehicle. Both influence the weight of the electric vehicle and therefore the consumption thereof. A readjustment of the individual state of charge prediction has therefore been recognized as useful.
- a piece information about an individual state of charge of the electric vehicle, in particular together with an associated time and/or an associated position. As a result, an alignment with the individual state of charge or individual state of charge profile on which the original prediction is based can be carried out. The individual state of charge prediction may be adjusted depending on this. In particular, a real-time acquisition of the individual state of charge may be carried out and therefore also may be used immediately for adjusting the individual state of charge prediction.

However, recording a time and/or a position together with the individual state of charge is also taken into consideration. This time or this position are then an assigned time or an assigned position. Together with this, it is possible to align even better with a timetable. In particular, it is possible to check when and in which position which actual state of charge arises. For example, if the acquired state of charge trails between a state of charge predicted at the time or an assumed state of charge but the vehicle is ahead with respect to its position according to the timetable, this has a different consequence for the predicted individual state of charge—in the ideal case specifically no consequence—than if the acquired state of charge trails and the vehicle is otherwise traveling according to the timetable or even trails in addition to its timetable. The individual state of charge prediction can therefore likewise be readjusted thereby.

In accordance with one aspect, it is proposed that the creation and/or change of the prediction of the arrival times, the individual state of charge prediction and/or the total state of charge prediction is effected by means of a corresponding prediction model, that is to say by means of a prediction model for arrival times, a prediction model for individual states of charge and a prediction model for the total state of charge, respectively. In particular, at least one of the described functionalities is implemented in each case in such a prediction model.

The prediction model for the total state of charge may be designed in particular so that it contains the predictions of the arrival times and the predictions of the individual states of charge as input variables. The prediction model for the total state of charge may identify a total state of charge profile in particular by virtue of the assigned individual states of charge being added to a total state of charge at the respective times according to the arrival times obtained. As a result, a changed value for the total state of charge profile may be obtained for each new arrival time. The initial value of the total state of charge profile before the first value of the individual state of charge is added may be zero.

The prediction model for arrival times may be based for example on an empirical value or an average arrival time for the respective vehicle and add up determined changes with a weighting factor, which may also be 1. A change may consist in the last-acquired value of the arrival time deviating from the arrival time determined previously as the average and this deviation is then the change that is to be taken into account. For this example, this change may be multiplied by a positive weighting factor<1 and added up.

The weighting factor may be for example 0.1 and would lead to an asymptotic approximation of this new value, which after ten steps has reduced the deviation by 63%, should the same new arrival time always have been acquired ten times. This produces a new value that may be assumed as the new average value and therefore can be taken as a basis successively in the next calculation. However, in as far as particular features are taken into account, such as construction works, for example, which as long as they exist lead to a predictable circumnavigation, which in turn uses an easily calculable time, this may be added directly, that is to say with a weighting factor of 1.

The procedure may be very similar in the case of the individual state of charge prediction and thus in the case of the prediction model. This may also proceed from an initial average value, or alternatively from an empirical value as initial value and then gradually track this value in the case of stochastic deviations, or may be added, or of course subtracted, depending on the sign, in the case of clearly calculable deviations.

The respective model thus maps the behavior of the variable that is to be predicted depending on the input variables that are respectively taken into account. The behavior can thereby be taken into account for the prediction. In particular, the prediction model for arrival times maps the behavior of the arrival times depending on the corresponding input variables, specifically depending on the corresponding information or additional information. The same applies for the prediction model for individual states of charge that maps the behavior of the individual states of charge depending on the corresponding input variables, specifically depending on the corresponding information or additional information. These two models may be combined in the prediction model for the total state of charge.

In accordance with one aspect, the creation and/or change of the prediction of the arrival times is effected by means of the prediction model for arrival times. The prediction model takes into account at least one piece of prediction information for arrival times to create a prediction of the arrival times as a model input, and takes into account at least one piece of additional information for arrival times to change a prediction of the arrival times as a further input variable. In particular, it is proposed that at least one piece of additional information for arrival times is taken into account as a disturbance variable.

The prediction model can therefore carry out the prediction in particular longer than one cycle before, in particular longer than one day before, specifically based on the at least one piece of prediction information for arrival times and additionally undertake an adaptation of the prediction, namely based on the at least one piece of additional information. These two aspects, that is to say the creation of the prediction of the arrival times and the change or readjustment of the prediction of the arrival times, may therefore be combined in one prediction model. The prediction model may in this case equally output several predictions separately or one after another. A prediction that does not yet use the additional information because it is not yet present may thus be output for the purpose of planning, specifically for long-term planning over a day in advance, particularly to a grid operator or electricity marketer. In the meantime, however, if the shorter period is started, this prediction may be readjusted and then output again, specifically as an adjusted prediction. This output may be effected consecutively or in two separate output channels.

In this context, in accordance with one aspect, it is proposed that the creation and/or change of the individual state of charge prediction is effected by means of a prediction model for individual states of charge that takes into account at least one piece of prediction information for individual states of charge to create a prediction of the individual states of charge as a model input, and that takes into account at least one piece of additional information for individual states of charge to change a state of charge prediction as a further input variable, in particular as a disturbance variable. In this respect, this prediction model for individual states of charge may operate exactly in the same way as the prediction model for arrival times, specifically as described above.

For both models, it also holds true that the respective additional information is taken into account as a disturbance variable. The implementation may therefore also be effected by means of a control engineering model that obtains the prediction information as input variables and the additional information as disturbance variables. For such a controlled system, the additional information therefore forms a disturbance variable but it is input into the model in the context of an input variable.

In this case, in particular the knowledge that the additional information actually acts as disturbance variables is also taken as a basis. They may arise specifically in an unpredicted and/or stochastic manner. For each case considered, many of the pieces of additional information do not have any stochastic properties but overall, that is to say over many days, months or even years, they may form stochastic variables. It is for this reason that consideration as disturbance variable is proposed here.

Very similarly, in accordance with one aspect, it is proposed that the creation and/or change of the total state of charge prediction is effected by means of a prediction model for the total state of charge, wherein the prediction model for the total state of charge, for each electric vehicle taken into account, takes into account at least one piece of prediction information for arrival times and/or for individual states of charge as a model input, and takes into account at least one piece of additional information for arrival times and/or for individual states of charge as a further input variable, in particular as a disturbance variable. All of this information may therefore be included in an overall model, specifically the prediction model for the total state of charge.

Furthermore or as an alternative, it is proposed that the prediction model for the total state of charge, for each electric vehicle taken into account, contains a prediction model for arrival times and a prediction model for individual states of charge, combines these to form a new model and/or emulates these as a combined model. In this way, the prediction model for the total state of charge may be created easily, specifically by virtue of a prediction model for arrival times and a prediction model for individual states of charge being contained. Each of these prediction models may be provided for each electric vehicle. However, provision may also be made for the same model to be used respectively for each electric vehicle but each with an adjusted dataset. Aside from this, such models may be realized in a process computer, both for these models individually and for the prediction model for the total state of charge as a whole.

In accordance with one aspect, it is proposed that the creation of the prediction of the arrival times is changed adaptively by virtue of each prediction of the arrival time for the prediction period being compared with an arrival time that has actually occurred in the prediction period and the future creation of the prediction is adjusted depending on the comparison, wherein this adaptation, namely the comparison and adjustment depending thereon, is repeated, in particular per cycle, in particular is repeated daily.

It has been recognized here that the arrival time based on the used information and probability considerations may nevertheless still have inaccuracies and therefore an additional improvement of the prediction of the arrival times is achieved by means of the proposed adaptation. In particular, an adaptation factor or adaptive correction value may be determined here, or a prediction model may be adjusted in terms of the parameterization thereof.

In particular, an adjustment or adaptation may be improved upon each repetition. In particular, the adaptation factor or the additive correction value, or parameters of the prediction model, may be brought closer to an ideal value, in particular asymptotically. This may be carried out for example for the proposed additive correction value as follows.

In the case of the comparison between a predicted arrival time and an acquired arrival time, a difference is formed and this difference is multiplied by a weighting factor, which is between zero and 1, and the result is added to an existing additive correction value. The value zero may be used as the initial value for this existing additive correction value. If, for example, the weighting factor is set as 0.1 and if the same difference should always result between the predicted arrival time and the actual arrival time, without taking into account the additive correction value, in this example the correction value would approximate this difference asymptotically, wherein in the case of the weighting factor of 0.1 mentioned by way of example, the difference would have moved closer to the ideal value by 63% after ten steps.

The procedure may also be similar in the case of other parameters. In the case of the adaptation factor, the additive correction value may be recalculated to an adaptation factor, for example. For this purpose, the predicted arrival time plus the additive correction factor may be divided by the predicted arrival time without this correction factor. An adaptation factor that is in particular in a range of from 0.9 to 1.1 and that also depends on the time base of the arrival time will thus emerge. For this purpose, a time base that defines a time zero as time base should be determined, because time does not have a natural starting point, unlike a state of charge. The time base used may be, for example, a time one hour before an expected arrival time. The expected arrival time would then be one hour based on this time base.

In general, any adaptive correction of the predictions on the basis of acquired arrival times may be based on any parameterization or on a model, the parameters or degrees of freedom of which are optimized by means of recorded observation data and past forecasts.

Furthermore or as an alternative, it is proposed that the creation of the individual state of charge prediction is changed adaptively by virtue of each individual state of charge prediction for the prediction period being compared with an individual state of charge that has actually occurred in the prediction period and the future creation of the prediction is adjusted depending on the comparison, wherein this adaptation, namely the comparison and adjustment depending thereon, is repeated, in particular per cycle, in particular is repeated daily.

In this case, the procedure may therefore be analogous to in the case of the adaptation of the prediction of the arrival times. No base for the individual state of charge needs to be defined analogously to the time base because a state of charge actually has an absolute zero value, specifically the complete discharge. In other words, a state of charge of 0% is clear.

Therefore, in this case the same proposals as for the adaptation of the prediction of the arrival times are also made, in particular in that an adaptation factor or additive correction value for the individual state of charge prediction may be created or that parameters of a prediction model for individual states of charge are adjusted additively.

In accordance with one aspect, it is proposed that a prediction model for arrival times is executed as an adaptive model, which adjusts one or more model parameters depending on a comparison between predicted arrival times and arisen arrival times. As already described, this can improve the prediction.

The model parameters may be adjusted, for example, such that there is a calculation from the comparison between the predicted arrival times and arisen arrival times back to the model parameters, that is to say for example there is a computation as to how the model parameters would have had to be set in order to obtain in each case the arisen arrival time instead of the predicted arrival time. As a result, a comparison or a difference of the model parameters with respect to fictitiously ideal model parameters can be derived. An adaptation factor or an additive correction value may then be determined for each model parameter in this way, as has already been explained above in another connection. As an alternative, an adaptation factor or an additive correction value for the model can be determined overall, which is implemented at the model output, for example.

Equally, one aspect proposed is that the prediction model for individual states of charge is executed as an adaptive model, which adjusts one or more model parameters depending on a comparison between predicted individual states of charge and arisen individual states of charge. In this case, the procedure may therefore be analogous to in the case of the adaptive prediction model for arrival times.

Model parameters may also be adjusted by virtue of the model parameters being identified from an input/output behavior of the respective model based on acquired input/output variables and the current model parameters being adjusted so as to form the (newly) identified model parameters by way of a transition function. In the linear case, the model parameters may be identified using a method that establishes an equation system for the model parameters and solves same using pseudo-inverses.

In accordance with one aspect, it is proposed that, when the total state of charge prediction is created and/or when the prediction of the arrival times is created and/or when the individual state of charge prediction is created, a respective probability evaluation is carried out. A probability evaluation, in particular a probability distribution, is therefore assigned to the respective predictions. The probability evaluation, in particular the probability distribution, may also form the prediction as such. This probability distribution may be specified for example for the arrival time and may specify the probability with which the electric vehicle arrives at the latest at the predicted or a predetermined arrival time. The value may be 90%, for example. For a later arrival time, for example a quarter of an hour later, this probability evaluation states the probability with which the electric vehicle has arrived at the latest at this second arrival time, that is to say 15 minutes later. With this type of evaluation, this value must logically be above 90% for the mentioned example and may be 95%, for example. Many values may be determined in this way and a probability distribution results.

Similarly, the individual state of charge prediction may be evaluated by virtue of it being stated at different individual states of charge how likely it is that the electric vehicle has at least the respective state of charge. At 0%, this value is logically 1 and for 100% is virtually zero. In this case, the moment when the electric vehicle reaches the charging terminal thereof can be taken as a basis.

Such a probability evaluation, in particular probability distribution, is also proposed for the total state of charge prediction. In this case, the total state of charge prediction is in principle somewhat more complex because it is provided as a time profile of the total state of charge. There is therefore such a probability evaluation for the total state of charge in principle for each time of the prediction period. In this case, the time profile of the total state of charge may preferably be assigned to a predetermined probability value, in particular a p-90, p-95, p-98 or p-99 value.

The p-99 value (the same applies analogously to the other mentioned values) states which state of charge the overall charging storage unit at least has reached at the respective time with a probability of 99%. For the same time, a respective state of charge value for other probabilities may also be present on account of a probability distribution. In this case, however, it is preferably proposed that in each case only the state of charge for a particular probability value is used for all times, that is to say like the p-99 value mentioned by way of example. The time profile of the total state of charge thus reflects the time profile of all of the p-99 values.

In accordance with one aspect, it is proposed that, for each electric vehicle, a prediction of the arrival time together with a probability evaluation, in particular with a probability distribution, and an individual state of charge prediction together with a probability evaluation, in particular with a probability distribution, are created and are each combined as a vehicle prediction. A vehicle prediction thus comprises a prediction of the arrival time of the electric vehicle in addition to the probability evaluation and an individual state of charge prediction of the same electric vehicle in addition to the probability evaluation.

Such vehicle predictions are therefore created for many vehicles, in particular for all of the vehicles of the fleet or the charging infrastructure, and the total state of charge prediction together with a probability evaluation, in particular with a probability distribution, is determined from all of these vehicle predictions.

Furthermore or as an alternative, it is proposed that the total state of charge prediction for a predetermined probability value is determined from all of the vehicle predictions in addition to the probability evaluation. This thus makes it possible to specify a profile of a total state of charge prediction with a high probability and the exchange power can be planned based on this. In particular, it is also proposed here to specify this profile of the total state of charge prediction for p-x values, in particular to determine and specify it for a p-90, p-95, p-98 or p-99 value. These p-90, p-95, p-98 or p-99 values are in this case also representative of similar values.

In accordance with one aspect, it is proposed that the power exchange is planned so that an exchange power is offered for exchange with the electricity supply grid, wherein the exchange power is ascertained depending on the total state of charge prediction. In this case, in particular, an exchange power profile or an exchange power band is offered and ascertained as the exchange power. The overall state prediction specifies a time profile and a corresponding exchange power can be offered based thereon, specifically so that corresponding power can be offered based on the total state of charge prediction including a desired state of charge that is intended to have been achieved at the end of the prediction period.

Where present, fluctuations may also be taken into account by way of the specification of an exchange power band. This is also based in particular on the concept that requirements or specifications of the electricity supply grid may be taken into account, according to which at some times instead a power oversupply exists and at other times instead a power demand exists. The exchange power, in particular such an exchange power profile or such an exchange power band, may be adjusted thereto and offer power accordingly. The total state of charge profile that has been predicted may form an important boundary condition for this, in that specifically the power exchange takes place so that an excessively high or excessively low total state of charge does not arise.

A charging infrastructure is proposed, namely a charging infrastructure prepared for planning a power exchange between the charging infrastructure and an electricity supply grid, wherein the charging infrastructure has a plurality of charging terminals for connecting and charging electric vehicles such that the electric vehicles can exchange electrical power with the electricity supply grid via the charging terminals, each electric vehicle has an electrical storage unit with a variable individual state of charge for drawing and outputting electrical power, all of the electrical storage units connected to the charging infrastructure form an overall storage unit of the charging infrastructure, which overall storage unit is characterized by a total storage capacity and a total state of charge, wherein the total storage capacity is variable and the total state of charge is variable, wherein the charging infrastructure is prepared, in particular has a control unit, to create a prediction of arrival times of the electric vehicles at the charging terminals thereof, and to create a total state of charge prediction as a prediction of the total state of charge for a prediction period depending on the prediction of the arrival times, wherein said charging infrastructure is prepared to create the total state of charge prediction as a time profile of the total state of charge and in particular it is prepared for the total state of charge prediction being created depending on timetables of the electric vehicles.

The charging infrastructure is therefore prepared to carry out at least one method according to one of the embodiments described above. To this end, provision may be made of a control unit, which is designed for example as a process computer and is connected to the charging terminals in order to exchange information with the charging terminals. This may be carried out in a wired or else wireless manner. In particular, the charging infrastructure is thereby prepared to carry out one of the methods so that corresponding programs are implemented in the control unit. Furthermore, connections for data transmission to the electric vehicles during travel may exist, that is to say in particular wirelessly. Provision is at least made for such data connections via which the control unit may receive information from the electric vehicles to be provided.

BRIEF DESCRIPTION OF THE SEVERAL VIEWS OF THE DRAWINGS

The invention is now explained in more detail below by way of example with reference to the accompanying figures.

DETAILED DESCRIPTION

Figure 1:
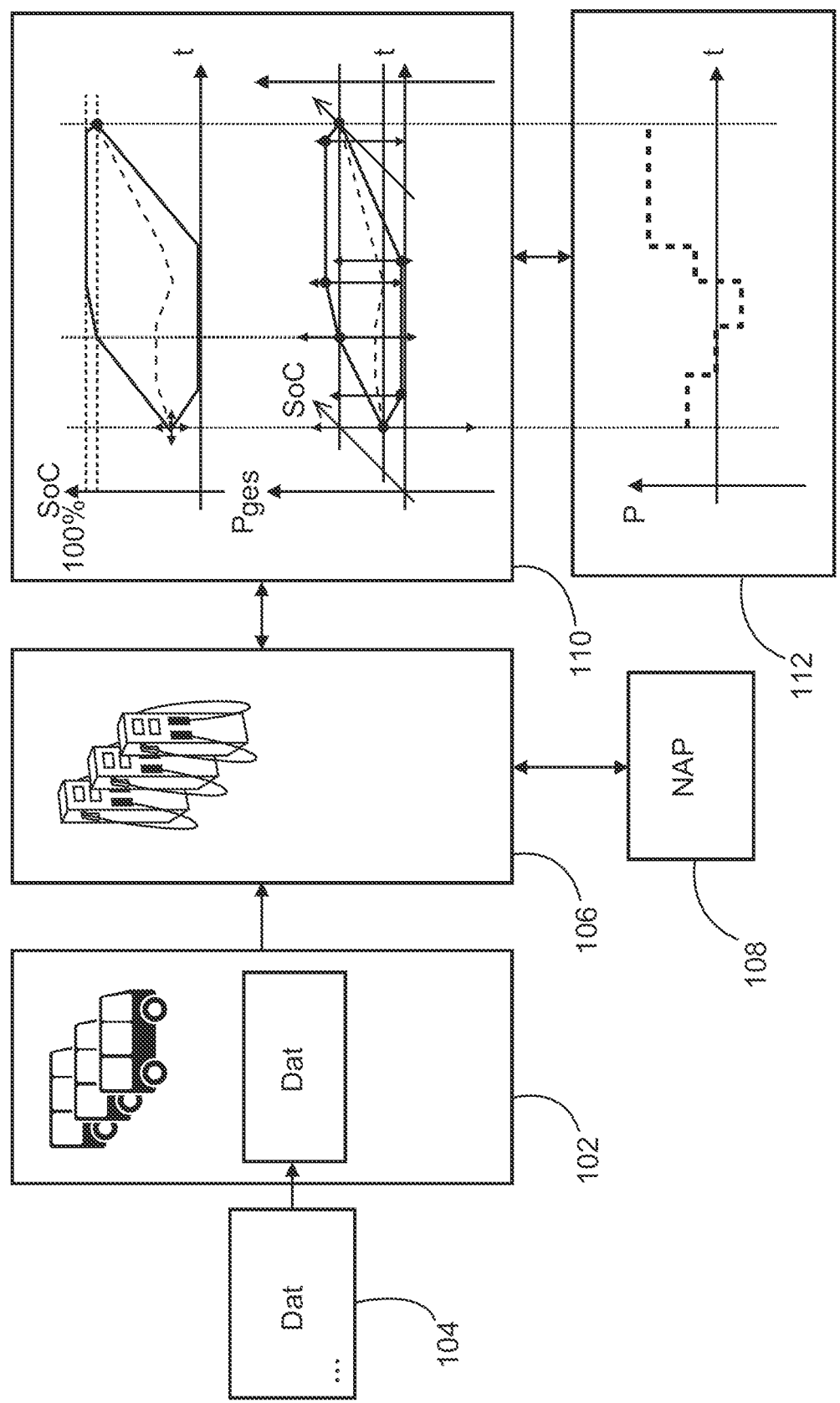
FIG. 1 shows a flowchart for illustrating the proposed method.

The flowchart in FIG. 1 is intended to explain the basic sequence of the proposed method. One concept of the method is that of utilizing storage capacities of a fleet containing electric vehicles in order thus to temporarily make available power to an electricity supply grid on a demand-dependent basis and also of controlling the drawing of electric power from the supply grid in a targeted manner in order to charge the storage units (e.g., batteries) of the electric vehicles of the fleet, taking into consideration the electricity supply grid. The method may also be used to achieve electricity price optimization. The fleet may thus be controlled such that it draws the required charging current as inexpensively as possible and in the process complies with the technical boundary conditions. It has in particular been identified that good planning of the technical resources is important for this purpose, and this may be achieved using the proposed method, in particular using a good prediction.

The fleet of electric vehicles is represented by the fleet block 102. The fleet block in this case contains information about the electric vehicles. This information contains information about the storage units of the respective electric vehicle, specifically detailed information, that is to say for each storage unit of each electric vehicle on its own. It also contains information about states of charge of the electrical storage units that the respective storage unit should have before the electric vehicle starts up, in particular in the morning. This is also based in particular on the concept that the fleet of electric vehicles is used for comparatively well-planned tasks, such as for example as an electric bus of a transport company for carrying out local public transport, to cite just one example.

Information about departure times of the respective electric vehicles may accordingly be known in the fleet block 102. The departure times in particular determine when the state of charge of the respective storage unit has to be reached. The departure time however also determines the time from which the storage unit of the corresponding electric vehicle is no longer connected to the electricity supply grid.

The fleet block may however also contain information about the maximum charging power or maximum discharging power that each of the storage units has in each case. Said information may be stored in the fleet block 102, wherein it may also be updated.

An input data block 104 is also shown illustratively. This input data block 104 in particular contains information or data that are highly changeable, in particular those that may change daily and/or may be updated daily. These include a timetable for the electric vehicles, if one is present, which may be present in the form of a bus timetable if the electric vehicles of the fleet are electric buses. Weather data, in particular a weather forecast, may however also be provided by this input data block 104. Such data are input into the fleet block 102 and may be combined or processed together with the data present in the fleet block 102. It is possible in this case, from such input data such as the bus timetable, to calculate or at least to estimate a time when the respective electric vehicle will arrive in the fleet and then be available to draw electric power from the electricity supply grid or to output electric power to the electricity supply grid.

It is also possible to calculate a state of charge of each electrical storage unit at the time when the corresponding electric vehicle arrives at the fleet, in particular when it is connected to the charging infrastructure. For this purpose, it is possible to use the data of the input data block 104, and further data may additionally be calculated from existing data of the fleet block 102, such as in particular the state of charge or expected state of charge of the electric vehicle when it arrives in the fleet. Knowledge about the storage unit, in particular its size, may in particular be used for this calculation. This information is then taken from the fleet block 102.

It is thereby proposed to create a forecast or prediction. This may also take place in the fleet block 102. It is pointed out at this juncture that the method may also in principle be implemented differently than necessarily having to use the explained blocks, such as the fleet block 102 and the input data block 104. These blocks may also for example be linked differently, or multiple input interfaces may be present in order to receive corresponding input data. By way of example, it may be expedient to receive a weather forecast from a source different from the bus timetable or another timetable. In this respect, the flowchart in FIG. 1 serves for basic explanation.

The forecast or prediction may then be transmitted to a charging infrastructure of the fleet. This charging infrastructure is represented by the infrastructure block 106. The infrastructure block 106 may in this case contain information about the charging infrastructure, specifically in particular a maximum charging power that is able to be specified by corresponding charging terminals. These charging terminals are likewise part of the charging infrastructure. An availability of the electrical storage units may also be known in the infrastructure block 106, in particular by virtue of the fact that the charging terminals each provide the information as to whether an electric vehicle is connected thereto, and possibly also what kind of electric vehicle or what kind of storage unit.

These data also result in part from the electrical storage units, and the data may thus possibly be received from the fleet block 102.

The infrastructure block 106 also contains the prediction data, specifically the respective arrival times of the electric vehicles at the charging terminals and likewise the individual states of charge of the electric vehicles as soon as they arrive at and are connected to the charging stations. These data are transmitted in the form of a prediction and processed further.

Provision is also made for a grid connection block 108 that is able in particular to make available information about the electricity supply grid and about grid connection points that are used. The grid connection points are those via which the charging terminals are ultimately connected to the electricity supply grid. The charging infrastructure may in this case be connected to the electricity supply grid via one or more grid connection points.

The grid connection block 108 may provide data about a maximum infeed power, a setpoint voltage and a setpoint reactive power. The maximum power, which may also be referred to as maximum exchange power, is that maximum power that is able to be fed into the grid or that is able to be drawn from the electricity supply grid. The setpoint voltage is in particular a voltage of the electricity supply grid at the respective grid connection point. A setpoint reactive power may be a reactive power that is specified by a grid operator and/or one that results from data of the electricity supply grid. This may include a level of the reactive power to be fed in, this being able to be determined on the basis of the current grid voltage.

All of these data may be provided, specifically to the infrastructure block 106 in accordance with the flowchart in FIG. 1. However, in this case too, such a block division does not necessarily have to take place.

The grid connection block 108 additionally illustrates that both the power able to be provided by the electric vehicles or their storage units, specifically active power, and a reactive power that is able to be provided is output to the one or the multiple grid connection points in order thereby to be fed into the electricity supply grid or to be drawn from the electricity supply grid.

A maximum exchange power for maximum exchange with the electricity supply grid may be determined from these data, in particular in the infrastructure block 106, or drawn. It is also possible to determine a maximum available active power. This may depend in particular on the states of charge of the electric vehicles. The same applies to the available reactive power which, although it requires little storage capacity of the electrical storage units, still requires at least a little storage capacity and additionally also requires free capacities for feeding corresponding current into the electricity supply grid.

In order to coordinate the individual storage units of the electric vehicles of the fleet so as then to be able to offer a common exchange power of the fleet to the electricity supply grid, provision is made in particular for a charging control unit (e.g., charging controller), which may also be referred to as an aggregator or may contain an aggregator.

This charging control unit or the aggregator uses the information explained above to create a state of charge range. This is illustrated in the aggregation block 110.

The aggregator, represented by the aggregation block 110, uses all of this information that was explained above with reference to FIG. 1 to determine a state of charge range. It is in particular proposed to determine a prediction for such a state of charge range. A state of charge range is spanned, in the form of a region or band, over the sum state of charge and time. This is illustrated in the top graph in the aggregation block 110. This plots the sum state of charge on the ordinate against time on the abscissa. The state of charge range is in this case formed by an upper limit and a lower limit. The sum state of charge runs in this range, that is to say between this upper limit and the lower limit.

Details in this regard and with regard to the lower graph of the aggregation block and also with regard to the exchange power block 112 shown below the aggregation block 110 are explained in more detail below together with FIG. 2.

In any case, the aggregator, which is illustrated by the lower graph in the aggregation block 110, may specify different exchange powers and thus exchange energies at different times, this being able to be shown as a third dimension in the graph. Such possible exchange powers or quotas for exchange powers may be transmitted to the exchange power block 112. The exchange power block 112 may likewise specify exchange power at different times based on availabilities or offers in the electricity supply grid, and thus specify a profile of the exchange power. This is illustrated in the graph of the exchange power block 112; different power levels are accordingly proposed in a time-dependent manner. The profile of the exchange power does not however have to run in levels. It could also run continuously.

Such calculation or specification of power packages or profiles for the exchange power may be carried out on the basis of the state of charge range and the data that the grid connection block 108 provides and that were explained above in connection with the grid connection block 108.

In this respect, the power block 112 or the profile of the exchange power shown by way of example therein may be understood to be a result or at least intermediate result or partial result of the proposed method. It is possible to determine, in particular to predict, a state of charge range from the data regarding the fleet in accordance with the fleet block 102, the data of the charging infrastructure in accordance with the infrastructure block 106, together with the data that the input data block 104 provides.

Based on this state of charge range that is illustrated in the upper graph of the aggregation block 110, it is possible to determine a profile of the exchange power over time, preferably including in the form of a prediction. To this end, it is possible to use in particular data regarding the electricity supply grid with regard to demand and offer that indicate when an exchange power is advantageous and at what level. The state of charge range offers a variation range for this, which may also be referred to as flex space, and thereby specifies the scope within which such a profile of the exchange power is able to be specified. The exchange power is in this case specified such that the sum state of charge remains in the state of charge range.

Figure 2:
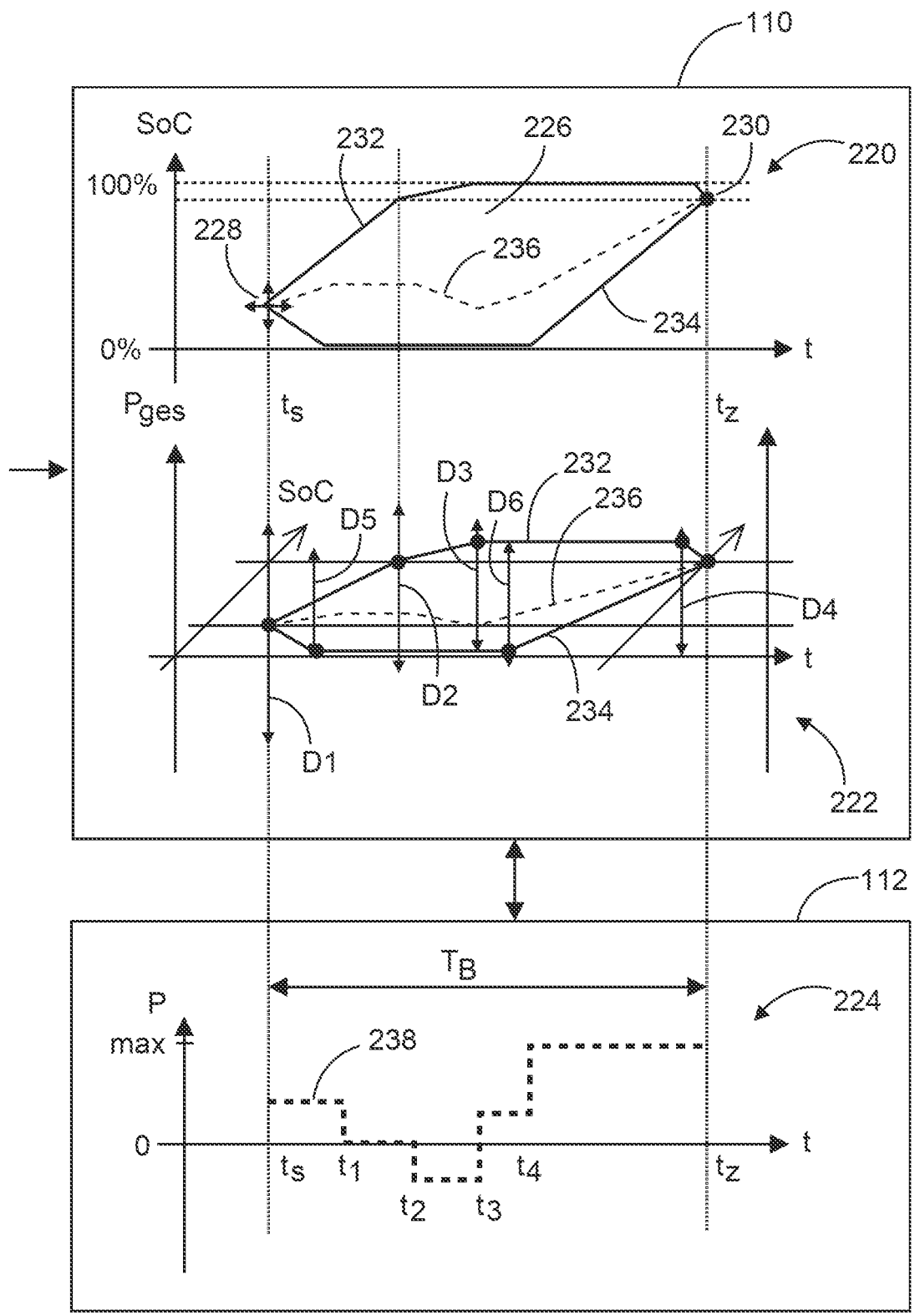
FIG. 2 shows a section of the flowchart from FIG. 1 for illustrating a state of charge range and the application thereof.

FIG. 2 shows a section of the flowchart of FIG. 1, specifically the aggregation block 110 and the exchange power block 112. The aggregation block 110, in the upper region, contains a state of charge graph 220 that illustrates a state of charge range. The lower region of the aggregation block 110 shows a variation graph 222 that builds on the state of charge graph 220 and additionally indicates a couple of variation possibilities for exchange power in an exemplary manner.

An exchange power graph 224 is shown in the exchange power block 112 and illustrates a possible profile of an exchange power over time, that is to say an exchange power profile. All three of these graphs, specifically the state of charge graph 220, the variation graph 222 and the exchange power graph 224, have the same time axis. A starting charging time $t_S$ and a target charging time $t_Z$ for the state of charge range are plotted in particular for illustration, and these times are also plotted by corresponding vertical lines in the other two graphs. The starting charging time $t_S$ and the target charging time $t_Z$ thus span the provision period $T_B$, which is plotted only in the exchange power block 112 for the sake of improved clarity. Depending on the view in terms of time, the provision period is the period in which the exchange power is intended to be provided. This is shown by the exchange power block 112. In order to plan this, a prediction is made for the provision period such that, when the prediction is made, the provision period is the prediction period. The provision period may be stipulated as a fixedly recurring period or the starting times thereof may themselves fluctuate depending on the prediction. The starting charging time $t_S$ must then not correspond to the starting time of the provision period.

The sum state of charge SoC is basically plotted against time t in the state of charge graph 220. This graph shows the state of charge range 226. The state of charge range 226 begins with a starting charging point 228 and ends with a target charging point 230. The starting charging point 228 is characterized by a value of the sum state of charge SoC and the starting charging time $t_S$. Both the level of the sum state of charge and the starting charging time $t_S$ may vary, and are preferably determined through a prediction, as has been explained in connection with FIG. 1, and specifically therein the fleet block 102 in connection with the data that the input data block 104 provides.

The sum state of charge SoC then runs from the starting charging point 228 to the target charging point 230. The target charging point 230 is characterized by the target charging time $t_Z$ and by the associated value of the sum state of charge SoC.

While the starting charging time $t_S$ is variable and depends on when the electric vehicles have actually returned to the fleet, the target charging time $t_Z$ may be very exactly defined, specifically when the electric vehicles set off as planned.

The profile that the sum state of charge SoC takes from the starting charging point 228 to the target charging point 230 is comparatively flexible. Precisely this has been identified, and it is proposed for this purpose to specify only limits that span a flex space, which specifically span the state of charge range 226. The state of charge range 226 in this case has a time-dependent upper limit 232 and a time-dependent lower limit 234. The time-dependent upper limit 232 may sometimes reach the value of 100%. All of the electrical storage units would then be fully charged. The lower limit 234 may also at least sometimes reach the lower value of 0%. This however serves only for illustration and it is often not advisable to completely discharge all of the storage units, because they may thereby be damaged. A value other than 0%, for example 20%, may thus be selected as minimum value of the lower limit 234. The same applies to the upper limit 232, for which a maximum value of 90% rather than 100% for example may be selected. This minimum value and this maximum value may also be selected on the basis of corresponding values of the individual electrical storage units.

The state of charge graph 220 thus illustrates that the upper limit 232 and the lower limit 234 span a state of charge range 226 in which the sum state of charge is able to move. A sum state of charge profile 236 is plotted by way of example in this respect. The sum state of charge profile may also be referred to synonymously as the total state of charge profile. It thus reflects the time profile of the total state of charge. The total state of charge may be referred to synonymously as the sum state of charge.

It may also be gleaned from the state of charge graph 220 that a variation in the starting charging point 228 also changes the state of charge range 226, at least in its starting region close to this starting charging point 228. The state of charge range 226 accordingly also depends on the prediction of the sum state of charge SoC at the beginning of the state of charge range 226, and it also depends on the prediction with regard to the starting charging time $t_S$.

The variation graph 222 contains the state of charge graph 220, wherein the coordinate axis for the sum state of charge SoC points into the plane of the drawing. The time axis has remained and a coordinate axis for the power P has been added. This power P in the variation graph 222 indicates how much exchange power is able to be output or drawn at which key point of the upper limit 232 or lower limit 234. Double-headed arrows D1-D6 are plotted for this purpose.

The double-headed arrow D1 relates to the starting charging point 228 and indicates that, at the time, both positive and negative exchange power are able to be offered to the same extent. The double-headed arrow D2 is plotted at the upper limit 232 and the exchange power may still be increased there, but it may in particular also be offered to a much greater extent with a negative value. At the double-headed arrow D3, and the same applies to the double-headed arrow D4, the upper limit 232 has reached its maximum value, and only negative exchange power is still able to be offered there. It is also the case for the double-headed arrow D4 that negative exchange power not only is able to be offered but also has to be offered in order still to reach the target charging point 230. However, the target charging point 230 may also be specified in the form of a minimum value, and the sum state of charge could then also be situated above this target charging point 230, and the double-headed arrow D4 would then also indicate only a possible negative exchange power. The exchange power could also be zero, but it may also not be positive, this being indicated by the double-headed arrow D4.

It is repeated at this juncture that a positive exchange power is one in the case of which the storage units are charged, and a positive exchange power is thus one in the case of which power is drawn from the grid and is stored in the electrical storage units.

The double-headed arrows D5 and D6 each indicate that only a positive exchange power is possible, because the lower limit 234 has already reached the minimum value here.

In this respect, these double-headed arrows D1-D6 only indicate possibilities and help to define a scope within which the exchange power is then actually able to be varied.

The sum state of charge profile 236 thus indicates a series of multiple sum states of charge. For each of these sum states of charge, that is to say for each point on the sum state of charge profile 236, it is possible to specify an interval or a minimum and a maximum value. Each value then also gives a trend for the sum state of charge that leads to a profile through the state of charge range that allows other exchange powers. Constant changes may in this case lead to a continuous profile. If however an electric vehicle departs or arrives, then the sum state of charge changes abruptly.

A profile of an exchange power, that is to say an exchange power profile 238, is now illustrated by way of example in the exchange power graph 224 of the exchange power block 112. Accordingly, at the starting charging time $t_S$, the exchange power and thus the exchange power profile 238 begins with a positive value. Power is thus drawn from the electricity supply grid and used to charge the storage units. The sum state of charge or the sum state of charge profile 236 accordingly increases. This may be seen both in the state of charge graph 220 and in the variation graph 222. At the time $t_1$, the exchange power profile 238 drops to zero and the sum state of charge profile 236 accordingly has a horizontal region.

At the time $t_2$, it has been planned, that is say predicted, and it is then also implemented, to feed power into the electricity supply grid, because a particularly high demand has been predicted here, which may also result from the fact that a large generator is shut down at night when little power is actually required, and so a power demand may still arise in the electricity supply grid.

This negative exchange power starting from the time $t_2$ may also be identified in the sum state of charge profile 236 through a falling edge.

At the time $t_3$, the exchange power is again changed to a positive value and the sum state of charge accordingly increases again. At the time $t_4$, the exchange power is increased again, and so the sum state of charge profile 236 also runs slightly more steeply starting from $t_4$. All of the storage units are thereby ultimately fully charged, as a result of which the sum state of charge profile 236 reaches the target charging point 230.

It is in particular proposed for the exchange power profile 238, as shown by way of example in the exchange power graph 224, to be determined in the form of a prediction. The grid operator or a grid control unit may then work with this prediction and set the grid management in accordance therewith.

Nevertheless, in particular in the range from $t_S$ to $t_4$, there is the possibility of varying the exchange power on an ad-hoc basis, that is to say of changing the actually specified exchange power profile 238. This may be performed for example when a power demand or else a power surplus offer occurs unexpectedly in the electricity supply grid. This may also be identified for example through a change in the grid frequency. It is thus proposed, when the grid frequency of the electricity supply grid exceeds a predetermined limit value, to increase the exchange power, that is to say to draw more power from the grid, and/or, if the grid frequency drops below a lower frequency value, to reduce the exchange power, that is to say to feed more exchange power into the electricity supply grid.

Figure 3:
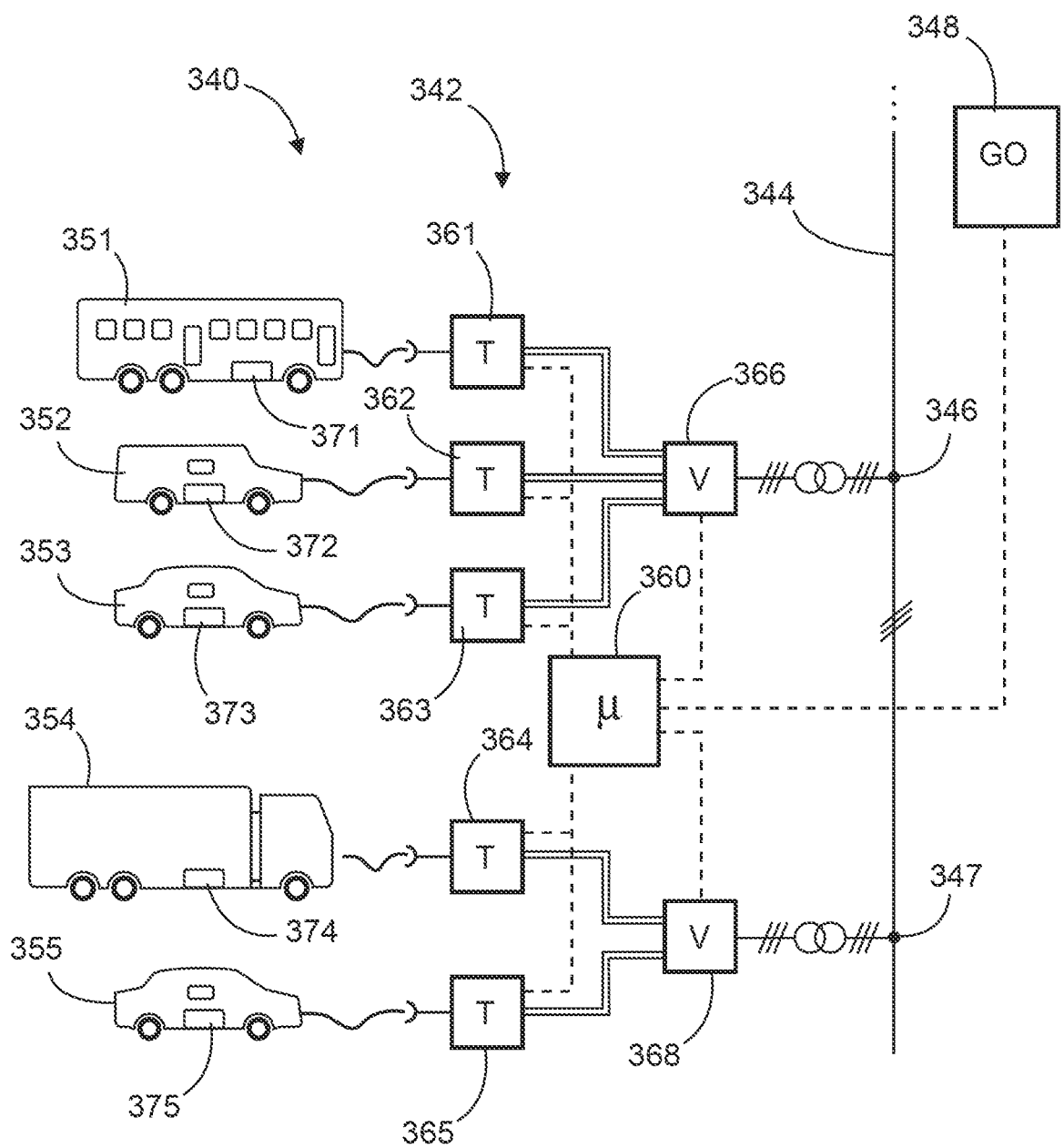
FIG. 3 schematically shows a fleet with a charging infrastructure.

FIG. 3 shows a fleet 340 with a charging infrastructure 342 that is connected to an electricity supply grid 344 via two grid connection points 346 and 347. The electricity supply grid has a grid control unit (e.g., grid controller) 348 that is able to control the electricity supply grid 344. The grid control unit 348 may also be operated by a grid operator.

The fleet 340, by way of example, has five electric vehicles 351-355, each of which is connected to one of the charging terminals 361-365. The charging terminals may be connected to the electricity supply grid 344 via distributor nodes 366 or 368 via a respective grid connection point 346 or 347.

The three electric vehicles 351-353 may thus feed power into or draw power from the electricity supply grid 344 via the grid connection point 346, and the electric vehicles 354 and 355 may feed power into or draw power from the electricity supply grid 344 via the grid connection point 347.

Nevertheless, provision is made for a charging control unit (e.g., charging controller) 360 that is able to actuate each individual charging terminal 361-365 and thus each storage unit of the electric vehicles 351-355. There is also provision for an optional possibility of the charging control unit also being able to actuate the distributor nodes 366 and 368. There is also provision for the charging control unit 360 to be able to communicate with the grid control unit 348. The charging control unit 360 may for this purpose transmit information to the grid control unit 348 and receive information therefrom. The charging control unit 360 may also be referred to as the control unit of the charging infrastructure, or it may be part of a control unit.

The information links between the charging control unit 360, on the one hand, and the charging terminals 361-365, the distributor nodes 366 and 368 and the grid control unit 348 are basically shown in dashed form. Power or energy transmission is possible via the other lines, which are illustrated in unbroken form.

The charging control unit 360 may have stored information about properties of the charging infrastructure 342 and/or receive it in the form of up-to-date data. It may also have stored information about properties of the electrical storage units of the electric vehicles 351-355 and, in particular via the charging terminals 361-365, receive and process up-to-date information about the state of charge and possibly other properties of the respective storage units of the electric vehicles 351-355.

It is thus possible with the charging control unit 360 to control all of the exchange power that is exchanged between the charging infrastructure 342 and the electricity supply grid 344. This exchange power is in this regard the sum of the partial exchange powers that are exchanged with the electricity supply grid 344 via the grid connection point 346 and the grid connection point 347.

Electrical storage units 371-375 are additionally indicated in the electric vehicles 351-355 for the sake of illustration.

Figure 4:
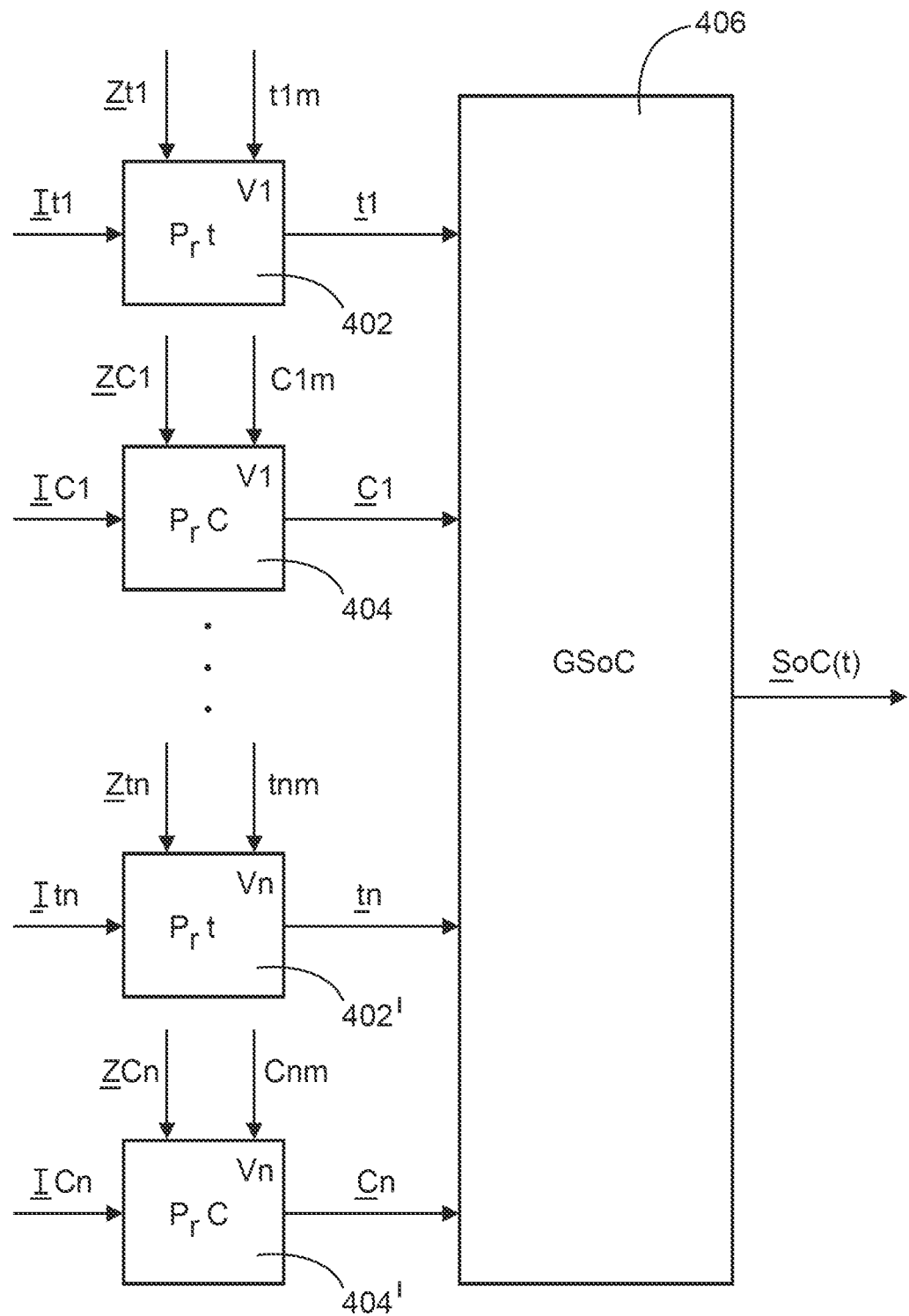
FIG. 4 schematically shows a structure for a prediction of a total state of charge.

The structure of FIG. 4 uses functional blocks to schematically explain how the total state of charge prediction can be carried out as a time profile of the total state of charge. To this end, this structure 400 of FIG. 4 in principle illustrates a procedure in two fundamental stages. In the first stage, which is illustrated by the left-hand part of FIG. 4, predictions for arrival times of the electric vehicles and predictions of the individual states of charge of the electric vehicles are carried out for each individual electric vehicle. All of these individual predictions are then combined in order to form the total state of charge prediction in a step illustrated in the right hand-part of FIG. 4.

FIG. 4 proceeds in a generalizing manner from n electric vehicles, which are indicated by the designation V1-Vn in the corresponding prediction blocks. One prediction block for arrival times 402 and 402', respectively, is provided and one prediction block for individual states of charge 404 and 404', respectively, is provided for each electric vehicle. For the sake of better clarity, these blocks are each illustrated only for the first vehicle V1 and the nth vehicle Vn. In this illustration, the number 1 is used for the first vehicle respectively as part of the variables for input and output variables, for which the letter n is used for the nth vehicle as part of the variables. In this context, the explanation of the blocks for the first electric vehicle can be transferred to the blocks of the nth vehicle and also to all blocks in between that are not illustrated.

Therefore, the prediction block 402, which obtains prediction information $\underline{I}t1$ for arrival times as input data, is provided for the first vehicle. The underlining makes it clear that this variable may be formed as a vector and may contain several individual variables, which also applies to all of the other variables of FIGS. 4 and 5. In particular, the prediction information for arrival times contains a piece of information about a timetable of the respective electric vehicle.

Furthermore, additional information $\underline{Z}t1$ for arrival times forms further input variables. A measurement value of an arrival time t1$m$ is also provided. This measurement of an arrival time could also be part of the additional information or the prediction information, but for the sake of improved clarity this value is mentioned as an extra and is also explained in more detail with respect to the meaning thereof in FIGS. 5 and 6.

Figure 5:
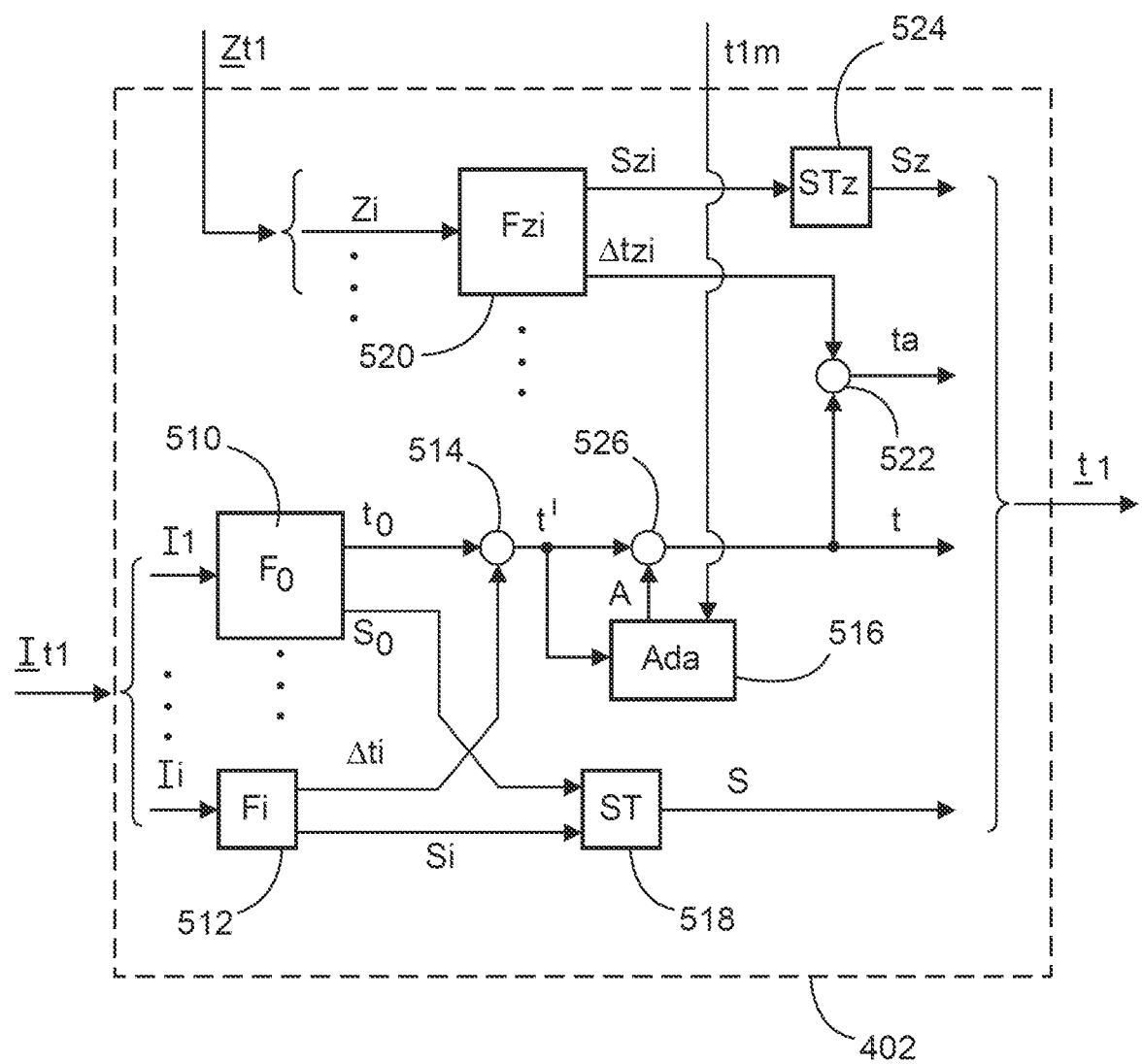
FIG. 5 schematically shows by way of example a possible structure of a prediction block in accordance with FIG. 4.

Finally, the prediction block for arrival times 402 thus outputs a predicted arrival time t1 as the result. However, since further information may be output together therewith, as is explained more in FIG. 5, FIG. 1 shows the vector $\underline{t}1$ as output variable of the prediction block 402. This is indicated by the underlining.

In a very similar manner, the prediction block for individual states of charge 404 contains prediction information for individual states of charge $\underline{I}C1$, which in particular contains a piece of information about a timetable of the respective electric vehicle in order to obtain thereby a first estimation of an individual state of charge upon arrival.

Furthermore, additional information $\underline{Z}C1$ for individual states of charge and also a measurement value of an individual state of charge C1$m$ are provided as input variable. The letter m is intended to indicate that a measurement is present. This also applies to the measured arrival time t1$m$.

The prediction block for individual states of charge 404 then outputs a prediction for the individual state of charge of the relevant electric vehicle, which may be denoted as C1 and is marked here as $\underline{C}1$, that is to say with an underlining in order to indicate that further values may be contained, specifically in particular a changed prediction of the individual state of charge as well as probability evaluations of the individual state of charge.

The output variables of a respective prediction block 402 for arrival times and of a respective prediction block 404 for individual states of charge of an electric vehicle may be combined as a vehicle prediction. In this context, the two prediction blocks 402 and 404 may also be combined as one block, which could be referred to as a vehicle prediction block.

In any case, the output variables of the prediction blocks 402 and 404 for each electric vehicle are input into the overall prediction block 406. The overall predictions may be determined therefrom in the overall prediction block, specifically the total state of charge prediction as a time profile of the total state of charge. This is output there as $\underline{S}oC(t)$. The variable t there does not denote an arrival time but the time as a variable in the conventional manner. In addition to the time profile, an adjusted time profile, which reflects a later change of the time profile, and also probability evaluations may also be output here. This is intended to be indicated by way of the underlining.

All of the input values into the overall prediction block 406 may be combined in particular by way of temporal superposition. In particular, time profiles of the individual states of charge may be added to the total state of charge. The probability evaluations may be used for a corresponding probability evaluation of the total state of charge in accordance with known ideas from probability theory.

FIG. 5 therefore illustrates by way of example and schematically the prediction block 402 of FIG. 4. However, this construction is not only representative of the other prediction blocks for arrival times but also of prediction blocks for individual states of charge in an analogous manner.

The input variables of the prediction block 402 have therefore been explained above in connection with FIG. 4. The prediction information for arrival times $\underline{I}t1$ is in this case divided symbolically into the individual values that are contained therein. In this case, the first value I1 forms the information about a timetable. This information is input into a timetable block 510, which determines an arrival time t0 therefrom. In the simplest case, this value t0 is contained in the timetable as the arrival time and may be adopted accordingly. Provided there is nothing further to take into account, this could already be the result of the prediction of the arrival time. However, it is rather unlikely that the arrival time in accordance with the timetable can be met exactly.

Further prediction information, for which Ii is representative of various further prediction information, is taken into account accordingly. In each case such a piece of prediction information is then input into a calculation block 512 and from this in each case a deviation time or time deviation $\Delta ti$ is calculated. This deviation time is added to the base arrival time t0 at the summing point 514. However, consideration is also given to the fact that the prediction information, or at least some of the pieces of prediction information, are evaluated together, for example by way of a neural network, which is trained for several pieces of prediction information together, to cite a further example.

This is carried out for all of the deviation times that have been determined from respective information for arrival times. All of these can be added to the base arrival time t0 at the summing point 514. The result is then a predicted provisional arrival time t'. This predicted provisional arrival time t' could already be the arrival time that is to be output by the prediction block 402. In this case, however, a further improvement with the aid of an adaptation block 516 is proposed. The adaptation block 516 is explained more in FIG. 6 and it then outputs an additive correction value A, which is added to the provisional arrival time t' at the summing point 526, such that the predicted arrival time t results, which would then of course be output as t1 for the first electric vehicle.

Furthermore, both the timetable block 510 and the calculation blocks, of which the calculation block 512 is representative, each concomitantly output a stochastic evaluation or a probability evaluation. This is indicated there as S0 and Si, respectively. Such stochastic information may be determined for example based on empirical values such as fluctuations that are recorded over time. For example, values of the arrival time that fluctuate without one of the further pieces of prediction information appearing to be responsible for this may be used for the probability evaluation. In the case of other prediction information, these probability evaluations may be determined in another way, as appropriate. However, the determination using empirical values is taken into consideration in principle for all prediction information and otherwise also additional information, both for the arrival times and for the individual states of charge. This is a fundamental idea and applies to all of the embodiments. Influences of the explained information, additional information or change information on the arrival times and/or individual states of charge and/or the total state of charge may also be derived from empirical values and be incorporated into the prediction. This is also a fundamental idea and applies to all of the embodiments.

However, to cite a further example, a weather forecast may also be a further piece of information and such a weather forecast is usually provided with a probability evaluation, which is thus concomitantly passed on. This may then be taken into account accordingly in the respective calculation block 512. These probability evaluations are combined in the stochastic block 518 and likewise output as overall statistical information or as overall probability evaluation S. This stochastic block serves in particular for illustration. Consideration is also given to the fact that the probability evaluations each remain linked to their prediction information, that is to say for example to the deviation time that has been determined from a weather forecast. $\Delta ti$ and Si may thus remain linked values. Consideration is then also given to a link with the adaptation block 516. The adaptation may for example benefit from probability information and the adaptation may influence the probabilities that are output.

Furthermore, an additional or subsequent change of the predicted arrival time t is provided. To this end, the additional information for arrival times $\underline{Z}t1$ may be evaluated in each case in an additional calculation block 520 basically as in the calculation block 512. The additional calculation block 520 is also representative of many such additional calculation blocks, specifically in each case one for a piece of additional information. FIG. 5 accordingly also indicates that the totality of the additional information $\underline{Z}t1$ is broken down into several individual pieces of additional information Zi.

In another configuration, the additional information could be processed directly together with or in block 510 and 512 and therefore be provided in block 514. The adaptation, of which the adaptation block 516 is representative here, may preferably be formed as a procedure only after the processing of the additional information. It is at least proposed in one variation to set weightings in the adaptation based on the additional information. For example, when t1$m$ deviates greatly from t0 because, for example, congestion has arisen, which can be gathered from one of the pieces of additional information or is input as additional information, then it is proposed that such a deviation is not weighted too greatly. The adaptation should not be too greatly influenced by such singular events and it is therefore proposed that the adaptation concomitantly takes into account the additional information, at least some of the pieces of additional information thereof, that is to say operates dependently on additional information. This is proposed generally, not only for the embodiment shown.

The result of the additional calculation block 520 is therefore a further deviation time or time deviation $\Delta tZi$, specifically for each piece of additional information. This time deviation $\Delta tZi$ is added to the predicted arrival time t at the summing point 522 and a changed predicted arrival time ta results.

A probability evaluation is also performed for the additional information and the change derived therefrom, specifically the deviation times $\Delta tZi$, and this probability evaluation can be recalculated in the additional stochastic block 524 in order to form the additional probability evaluation Sz. In this case, too, as an alternative, the probability evaluations can each remain linked to the prediction information thereof, with the result that the additional stochastic block 524 also essentially serves for explanation here.

Finally, the values calculated in this way, specifically the additional probability evaluation Sz, the changed prediction of the arrival time ta, the predicted arrival time t and the probability evaluation S, are combined to form the output vector t1 and are output. As explained in FIG. 4, this result can then be transmitted to the overall prediction block 406.

Figure 6:
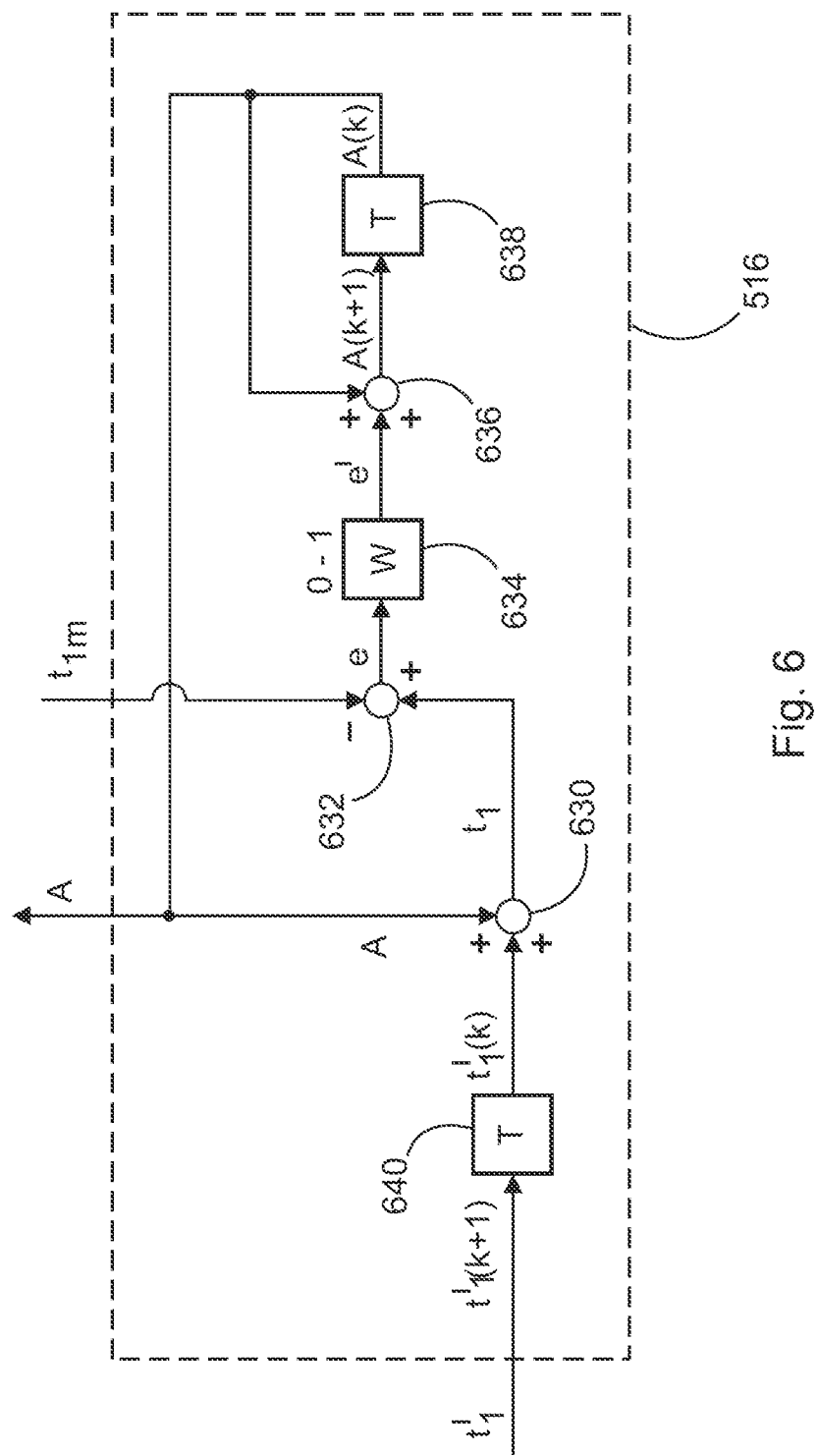
FIG. 6 schematically shows by way of example an option of an adaptation block in accordance with FIG. 5.

The adaptation block 516, which is shown in FIG. 6 schematically and otherwise also only by way of example, is provided in order to improve the predicted provisional arrival time t'. The predicted provisional arrival time t1' accordingly forms the input of the adaptation block 516. After the sample-and-hold element 640, a correction value A is added to said predicted provisional arrival time in the summing point 630. The result is then the corrected, that is to say final, predicted arrival time, which in this adaptation block functions however only as an intermediate variable. However, the same adaptation takes place in FIG. 5 in the summing point 514. For this purpose, the adaptation block 516 outputs the additive correction value A.

In order to carry out the adaptation, provision is made for this corrected arrival time t1 to be compared with an actually measured arrival time t1$m$. In this case, the measured arrival time t1$m$ has been measured in particular in an earlier cycle, in particular the most recent cycle, and/or in an earlier stage, particularly on the day before, or two days before.

The comparison is carried out in such a way that a difference is formed in the summing point 632. The result is therefore a difference in the context of a control error e. This difference is multiplied by a weighting factor in accordance with the weighting block 634. The weighting block has a factor, specifically a weighting factor, which should be between zero and 1. It should not assume the value of zero exactly because then logically there is no more consideration taking place. However, the weighting factor could assume the value of 1. The adaptation would then be carried out in full, in the ideal case, specifically in one step.

However, since in principle fluctuations are to be assumed in any case, rather lower values are useful, such as a value of 0.1, for example. The correction factor A is therefore basically led to a final correction value by way of a delay element of the first order. In any case, the result of the weighting block 634 is a weighted control error e'. This is added to the correction value of the previous stage at the summing point 636. The result is therefore the new correction value A', which is provided via the holding element 638 in order to form the current correction value A. The correction factor A may therefore also be denoted A(k) and the new correction factor A' may be denoted A(k+1).

In any case, an adaptation may be carried out as explained in FIG. 6. The structure of FIG. 6 is in this case an example of an adaptation by means of an additive correction value, specifically the correction value A. This correction value A therefore retains its value even if the ideal state arises, specifically that the predicted arrival time corresponds to the measured arrival time and the control error e is therefore zero. The implementation of this adaptation is therefore carried out so that the measurement of the arrival time t1$m$ is compared in each case with the preceding predicted associated arrival time. In other words, there is likewise a prediction for the previous day present for the measured arrival time of this previous day and these two times are compared. The correction value A ascertained in this case may equally be used for the current prediction for which there is no measurement present as a matter of principle.

The holding element 640 is accordingly marked in FIG. 6 in order to make it clear that it is not the current provisional prediction value t1' that is used for the adaptation but the previous value. However, this is to be understood schematically and consideration is also given to taking earlier values, specifically adjusted to the associated measurement values t1$m$. For the purpose of illustration, the input variable of the holding element 640 is accordingly illustrated as t1'(k+1) and the output value is accordingly marked as t1'(k). The holding time in the holding element 640 may accordingly be one day or else several days, in particular 2 days.

The model parameters, in particular the calculation blocks 512 and the additional calculation blocks 520, but even where appropriate the timetable block 510, may be adapted in a similar manner. In the case of such model adaptation, however, it is not the output variables or states that are adjusted but the parameters, that is to say in particular factors.

For such an adaptation, the procedure may be such that, in the corresponding model that is to be adjusted, the one parameter is changed or the plurality of parameters are changed for example uniformly or according to another connection until the output corresponds to the comparison measurement. The parameters that have then arisen may be compared with the parameters that were present before the change. A respective difference may be formed and using this difference the procedure may be analogous to using the control error e at the output of the summing point 632 of FIG. 6. The deviation is thus multiplied by a weighting factor between zero and 1 and the result is added to an earlier correction value, which in this case may be a correction factor, and this sum is divided via a holding element in order to provide said sum for addition at the summing point 636 for the next run. In the next run, the process is repeated, wherein it is started again with the change of the parameters, which therefore form model parameters.

As an alternative, an adaptation for the prediction may also be performed as is known from control engineering for the adaptation of a controller. In this case, the prediction model instead of the controller would then be adjusted. In this case, consideration is given in particular to the self-tuning method, in which the system and therefore also the changes thereof are identified from the observation of input and output variables. The model can then be adjusted accordingly from the changes identified in this manner. In this context, the prediction information and the additional information that is to be taken into account in each case, the input variables and the predicted arrival time or in the case of the individual state of charge prediction the predicted individual state of charge, the output variable and the respective model for the determination of the respective arrival time or the respective individual state of charge may be considered in this case as the system.

The object of predicting both the time and the state of charge including the probability distribution as well as possible was also set as.

It has been recognized that, as an alternative, a charging energy demand and a charging period, in particular with a variable starting time and fixed end time, may also be predicted.

It has been recognized that such predictions may be required in the aggregation of mobile storage units to form a joint storage capacity, which may be provided as a flexibility space.

In particular, this involves providing information for an aggregation in order to form a high-availability storage system.

Provided herein is providing and using probability dependent state of charge (SoC) and arrival predictions for e-mobility applications in route service, in particular for buses and logistics. Consideration is also given to applications in car or bike sharing.

The idea is focused on a prediction of the arrival time (including probability distribution) and the state of charge (including probability distribution) of a vehicle at a charging point. This is required for the aggregation (see figures, particularly FIGS. 2 and 3). This makes it possible to use a very high proportion of the battery capacity with high availability for global and local system services and/or electricity arbitrage transactions. The predictions are in this case created in advance, in particular one day in advance, specifically before the initial provision of charging energy, and may be updated in dynamic fashion.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for planning an electrical power exchange between a charging infrastructure and an electricity supply grid,
wherein:
the charging infrastructure includes a plurality of charging terminals operable to be connected to a plurality of electric vehicles, respectively, and charge the plurality of electric vehicles such that the plurality of electric vehicles exchange the electrical power with the electricity supply grid via the plurality of charging terminals,
each electric vehicle of the plurality of electric vehicles has a battery of a plurality of batteries, the battery having an individual state of charge of a plurality of individual states of change that is variable, and the battery is operative to draw or output the electrical power, and
the plurality of batteries connected to the charging infrastructure form an overall battery of the charging infrastructure, and the overall battery is characterized by a total storage capacity and a total state of charge, wherein the total storage capacity is variable, and the total state of charge is variable, and
wherein the method comprises:

determining a plurality of arrival time predictions of the plurality of electric vehicles at the plurality of charging terminals; and
determining a total state of charge prediction for the total state of charge for a prediction period depending on the plurality of the arrival time predictions, wherein the total state of charge prediction is a time profile of the total state of charge, wherein determining the total state of charge prediction depending on the plurality of the arrival time predictions includes determining the total state of charge prediction depending on timetables of the plurality of electric vehicles, wherein the timetables are defined by predetermined arrival times and departure times of the plurality of electric vehicles.

2. The method as claimed in claim 1, comprising:
determining the total state of charge prediction at least one day before a start of the prediction period.

3. The method as claimed in claim 1, comprising:
determining a plurality of individual state of charge predictions for the plurality of individual states of charge, respectively, wherein each individual state of charge prediction is a time profile of the individual state of charge; and
determining the total state of charge prediction depending on the plurality of individual state of charge predictions.

4. The method as claimed in claim 1, comprising:
determining the plurality of arrival time predictions depending on at least one type of information for arrival time selected from a list including:
information about a timetable of an electric vehicle that includes planned travel times,
information about the timetable of the electric vehicle that includes planned travel routes,
current transport infrastructure information of a region associated with the electric vehicle,
arrival times of preceding days stored for the electric vehicle,
a weather forecast,
information about events that affect a volume of traffic in the region associated with the electric vehicle, and
information on a driver of the electric vehicle and/or a driving behavior of the electric vehicle.

5. The method as claimed in claim 1, comprising:
determining an individual state of charge prediction of the plurality of individual state of charge predictions depending on at least one type of information selected from a list including:
information about a timetable of an electric vehicle that includes planned travel times,
information about the timetable of the electric vehicle that includes planned travel routes,
information on properties of the electric vehicle,
information on properties of the battery of the electric vehicle,
information on individual states of charge stored for the electric vehicle upon arrival at a charging terminal in accordance with an acquisition of preceding days,
information on a predeterminable individual state of charge of the electric vehicle at a beginning of a trip when the electric vehicle is disconnected from a charging terminal,
current transport infrastructure information of a region associated with the electric vehicle,
a weather forecast, information on events that affect a volume of traffic in the region associated with the electric vehicle, information on a driver of the electric vehicle and/or a driving behavior of the electric vehicle, information on a state of the electric vehicle, information on a state of the battery of the electric vehicle, and information on a model inaccuracy or errors in an acquisition of an individual state of charge.

6. The method as claimed in claim 1, comprising:
changing the total state of charge prediction, after determining the total state of charge prediction, depending on:
   a change of an arrival time prediction of the plurality of the arrival time predictions; and/or
   a change of an individual state of charge prediction of the plurality of individual state of charge predictions.

7. The method as claimed in claim 1, comprising:
changing the plurality of the arrival time predictions, after determining the plurality of arrival time predictions, depending on at least one piece of additional information for arrival time selected from a list including:
   information that a timetable has changed,
   information on an acquired traffic situation and/or a prediction of the traffic situation,
   information on weather or a weather forecast for the prediction period received after determining the total state of charge prediction,
   information on a deviation of a current position of an electric vehicle from a planned position in accordance with a timetable, and
   information on loading or average passenger occupancy of the electric vehicle.

8. The method as claimed in claim 1, comprising:
changing an individual state of charge prediction, after determining the individual state of charge prediction, depending on at least one piece of additional information for individual states of charge selected from a list including:
   information on an acquired traffic situation and/or a prediction of the traffic situation,
   information on weather or a weather forecast created for the prediction period after determining the total state of charge prediction,
   information on a deviation of a current position of an electric vehicle from a planned position according to a timetable,
   information on loading or average passenger occupancy of the electric vehicle, and
   information on an individual state of charge of the electric vehicle together with an associated time and/or an associated position.

9. The method as claimed in claim 1, wherein determining or changing the plurality of arrival time predictions, a plurality of individual state of charge predictions and/or of the total state of charge prediction is performed using a prediction model for a plurality of arrival times, a prediction model for the plurality of individual states of charge and a prediction model for the total state of charge, respectively.

10. The method as claimed in claim 1, wherein:
determining or changing the plurality of arrival time predictions is performed using a prediction model for the arrival times that uses:
   at least one piece of prediction information for the arrival times to determine a prediction of the arrival times as a model input, and
   at least one piece of additional information for the arrival times to change the prediction of the arrival times as a further input variable, and/or
determining or changing the plurality of individual state of charge predictions using a prediction model for individual states of charge that uses:
   at least one piece of prediction information for individual states of charge to determine a prediction of the individual states of charge as a model input, and
   at least one piece of additional information for the individual states of charge to change a state of charge prediction as a further input variable, and/or
determining or changing the total state of charge prediction using a prediction model for the total state of charge that, for each electric vehicle of the plurality of electric vehicles, uses:
   at least one piece of prediction information for the arrival times and/or for individual states of charge as a model input, and
   at least one piece of additional information arrival times and/or for individual states of charge as a further input variable, and/or
the prediction model for the total state of charge, for each electric vehicle of the plurality of electric vehicles, includes the prediction model for the arrival times and a prediction model for individual states of charge and combines the prediction model for the arrival times and the prediction model for the individual states of charge form a combined model and/or emulates the prediction model for the arrival times and the prediction model for the individual states of charge as a combined model.

11. The method as claimed in claim 1, comprising:
changing the plurality of arrival time predictions adaptively, wherein each arrival time prediction for the prediction period is compared with an occurring arrival time in the prediction period, and a subsequent arrival time prediction is adjusting depending on the comparison, and/or
changing a plurality of individual state of charge predictions adaptively, wherein each individual state of charge prediction for the prediction period is compared with an occurring individual state of charge in the prediction period, and a subsequent individual state of charge prediction is adjusted depending on the comparison.

12. The method as claimed in claim 11, wherein changing the plurality of arrival times predictions adaptively or changing the plurality of individual state of charge predictions adaptively is performed daily.

13. The method as claimed in claim 1, wherein:
a prediction model for the arrival times for determining and/or changing the plurality of arrival time predictions is executed as an adaptive model, and the adaptive model adjusts one or more model parameters depending on a comparison of predicted arrival times and realized arrival times, and/or
a prediction model for individual states of charge for determining and/or changing a plurality of individual state of charge predictions is executed as an adaptive model, and the adaptive model adjusts one or more model parameters depending on a comparison between predicted individual states of charge and realized individual states of charge.

14. The method as claimed in claim 1, wherein in response to determining the total state of charge prediction, the plurality of arrival time predictions and/or an individual state of charge prediction, a respective probability evaluation is performed.

15. The method as claimed in claim 1, wherein:
for each electric vehicle of the plurality of electric vehicles, an arrival time prediction together with a probability distribution, and an individual state of charge prediction together with a probability distribution, are determined and combined as a vehicle prediction of a plurality of vehicle predictions, and
the total state of charge prediction together with a probability distribution is determined from the plurality of vehicle predictions and the probability distributions.

16. The method as claimed in claim 15, wherein the total state of charge prediction for a predetermined probability value is determined from the plurality of vehicle predictions and the probability distribution.

17. The method as claimed in claim 1, wherein the exchange of the electrical power is planned such that the electrical power, an exchange power profile or an exchange power band is offered for exchange with the electricity supply grid, and the electrical power, the exchange power profile or the exchange power band is determined depending on the total state of charge prediction.

18. A charging infrastructure for planning an exchange of electrical power between the charging infrastructure and an electricity supply grid,
wherein:
the charging infrastructure includes a plurality of charging terminals operable to be connected to a plurality of electric vehicles, respectively, and charge the plurality of electric vehicles such that the plurality of electric vehicles exchange the electrical power with the electricity supply grid via the plurality of charging terminals,
each electric vehicle of the plurality of electric vehicles has a battery of a plurality of batteries, the battery having an individual state of charge that is variable, and the battery is operative to draw or output the electrical power, and
the plurality of batteries connected to the charging infrastructure form an overall battery of the charging infrastructure, and the overall battery is characterized by a total storage capacity and a total state of charge, wherein the total storage capacity is variable and the total state of charge is variable,
wherein the charging infrastructure comprises:
a controller configured to:
determine a plurality of arrival time predictions of the plurality of electric vehicles at the plurality of charging terminals; and
determine a total state of charge prediction for the total state of charge for a prediction period depending on the plurality of arrival time predictions, wherein the controller is configured to determine the total state of charge prediction as a time profile of the total state of charge, wherein determining the total state of charge prediction depending on the plurality of the arrival time predictions includes determining the total state of charge prediction depending on timetables of the plurality of electric vehicles, wherein the timetables are defined by predetermined arrival times and departure times of the plurality of electric vehicles.

* * * * *